(12) United States Patent
Takaki et al.

(10) Patent No.: US 6,913,257 B2
(45) Date of Patent: Jul. 5, 2005

(54) SHEET SEPARATION ROLLER CONFIGURATION

(75) Inventors: Kosuke Takaki, Fukuoka (JP); Takao Araki, Fukuoka (JP); Junichi Suematsu, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 693 days.

(21) Appl. No.: 09/866,779

(22) Filed: May 30, 2001

(65) Prior Publication Data

US 2002/0001105 A1 Jan. 3, 2002

(30) Foreign Application Priority Data

| May 31, 2000 | (JP) | 2000-162034 |
|---|---|---|
| May 31, 2000 | (JP) | 2000-162035 |
| Jun. 16, 2000 | (JP) | 2000-181113 |
| Jun. 16, 2000 | (JP) | 2000-181114 |
| Jun. 16, 2000 | (JP) | 2000-181115 |

(51) Int. Cl.$^7$ .................................................. B65H 3/52
(52) U.S. Cl. ............... 271/125; 271/265.04; 271/10.13; 271/122; 271/121
(58) Field of Search ........................... 271/265.04, 125, 271/124, 123, 122, 121, 188, 10.11, 10.13, 18, 18.1; 358/496, 498, 474

(56) References Cited

U.S. PATENT DOCUMENTS

| 4,869,490 A | * | 9/1989 | Reid | 271/122 |
| 4,871,162 A | * | 10/1989 | Imai et al. | 271/35 |
| 5,571,265 A | * | 11/1996 | Yagi et al. | 271/119 |
| 5,651,542 A | * | 7/1997 | Yamauchi et al. | 271/122 |
| 6,234,470 B1 | * | 5/2001 | Okitsu et al. | 271/114 |
| 6,260,839 B1 | * | 7/2001 | Araki et al. | 271/10.11 |
| 6,672,579 B2 | * | 1/2004 | Araki et al. | 271/122 |

FOREIGN PATENT DOCUMENTS

| JP | 4-286558 | 10/1992 |
| JP | 11020966 A | * 7/1997 | B65H/3/52 |

* cited by examiner

*Primary Examiner*—Patrick Mackey
(74) *Attorney, Agent, or Firm*—Wenderoth, Lind & Ponack, L.L.P.

(57) ABSTRACT

An image reader comprising a reading glass plate facing an optical scanning system and a platen roller provided opposite to the reading glass plate; both being grounded. It is combined with an automatic sheet feeder, which comprises a retardation roller containing torque limiters and corrugation rollers. An optimized combination of these rollers provides an ideal sheet transfer and avoids overlaid sheet transfer. Generation of paper dust and toner particles is minimized in the optimized sheet transfer. Furthermore, sticking of such dust and particles on the reading glass plate and the platen roller is prevented in an image reader of the present invention. Thus the image reader reads out high quality images without being affected by dispersed paper dust or toner particles, while overlaid transfer of mother document sheets is prevented in the sheet feeder.

8 Claims, 19 Drawing Sheets

FIG. 4
(a)
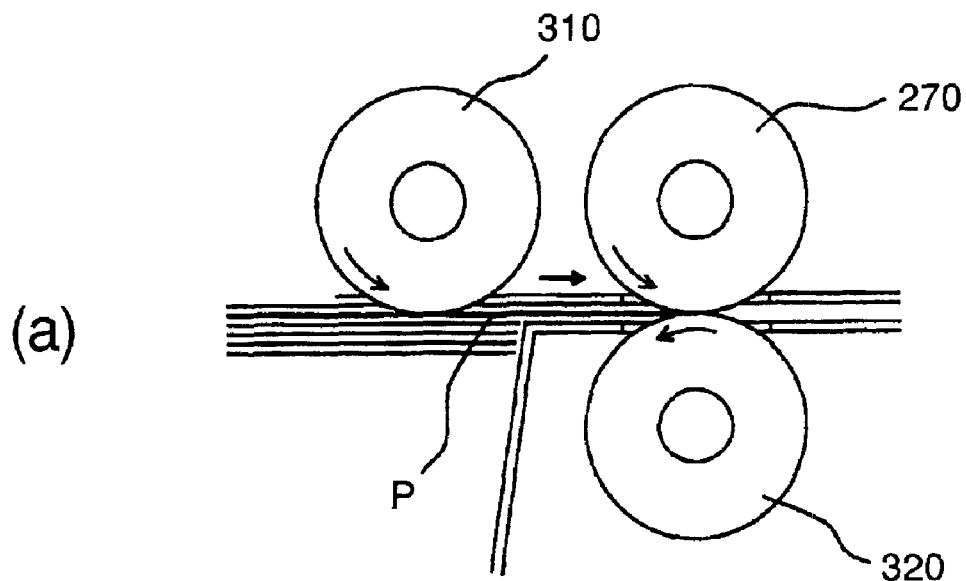
(b)
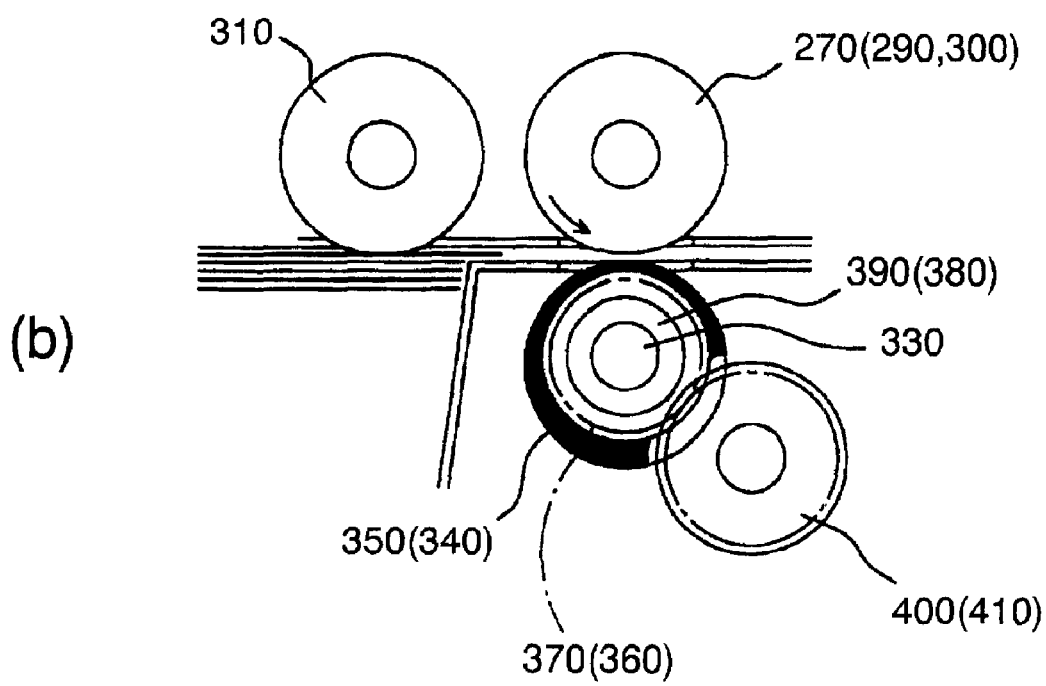

FIG. 5
(a)
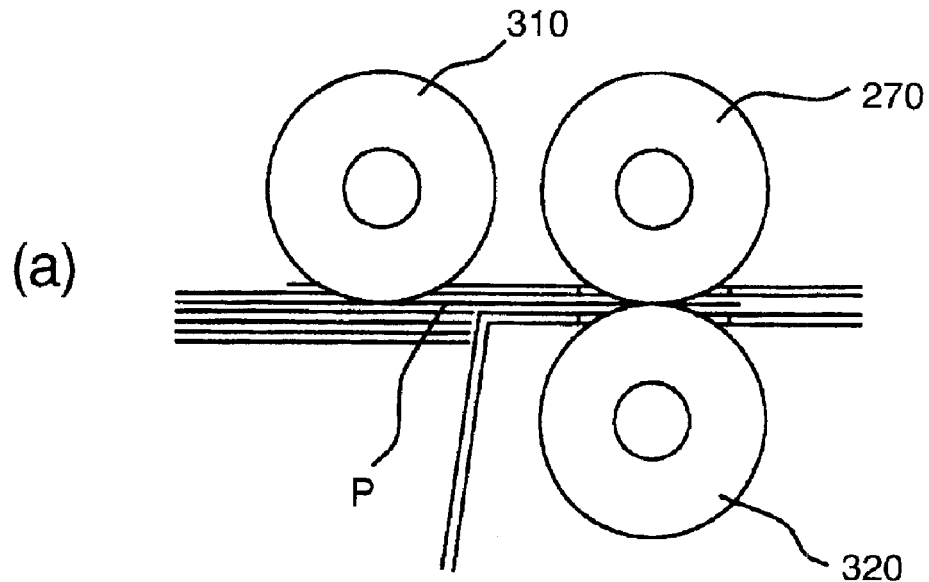
(b)
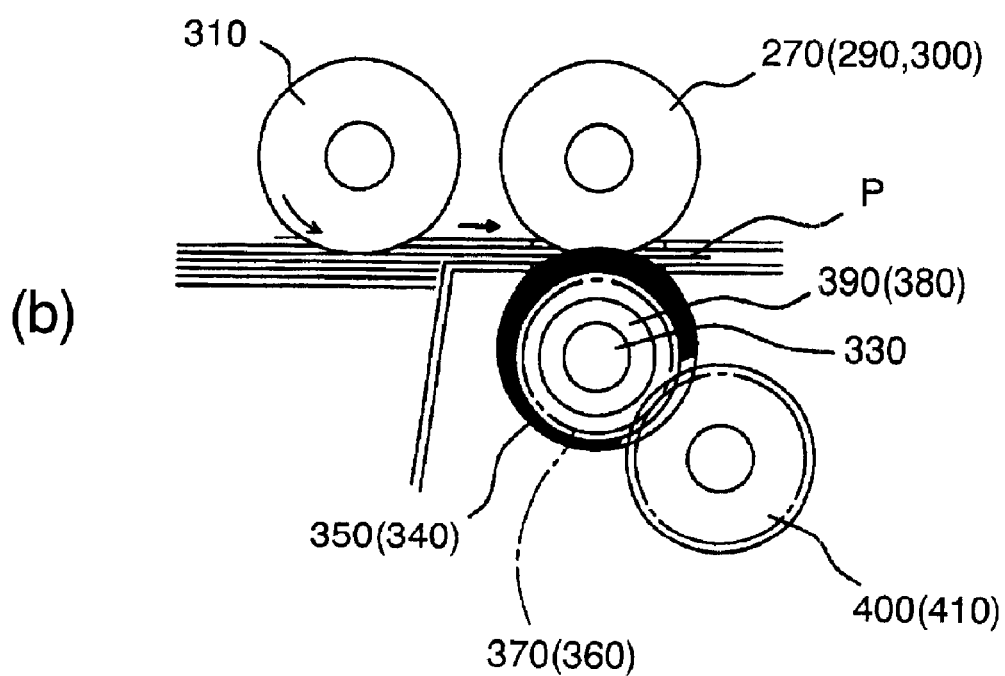

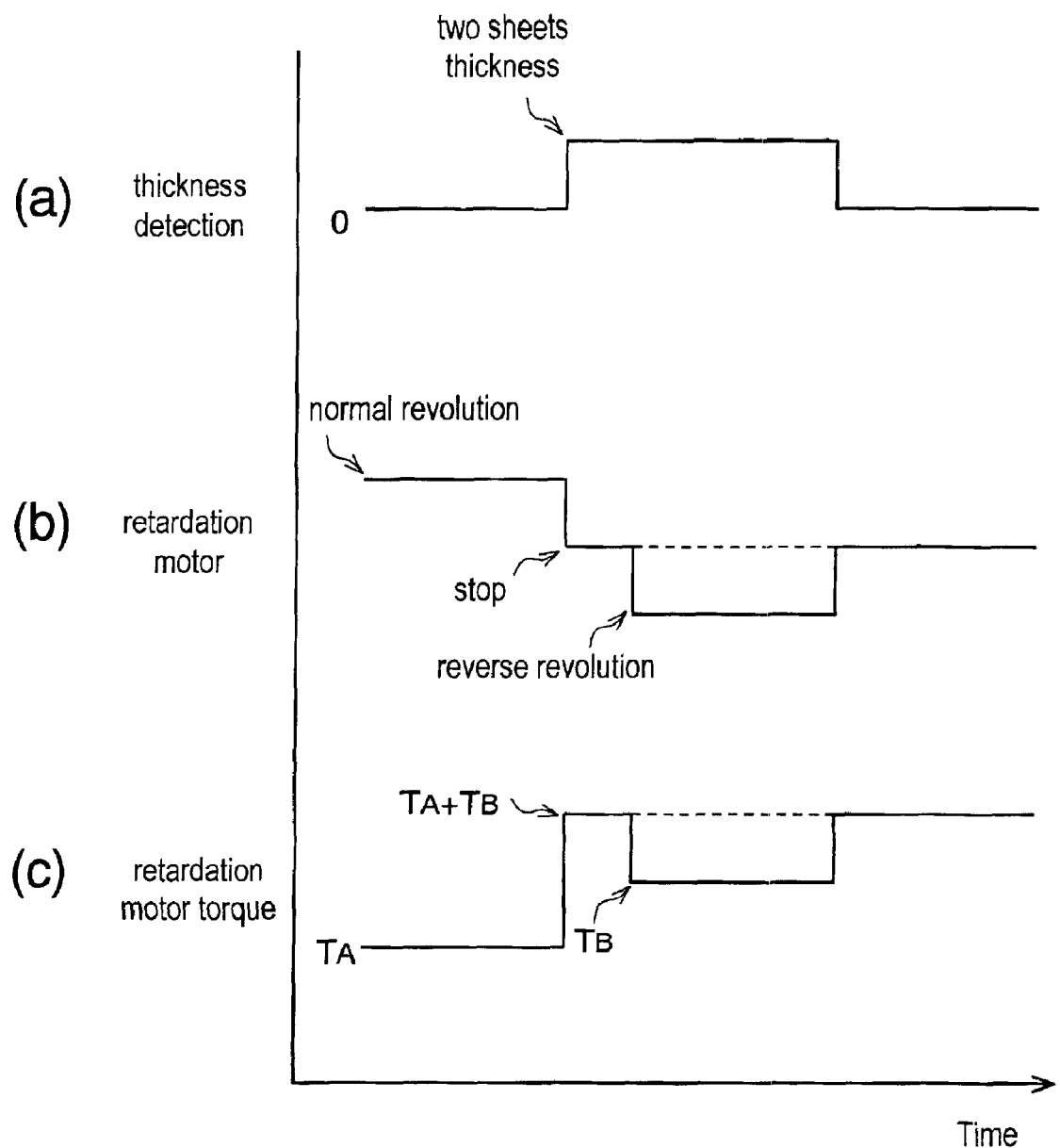

SHEET SEPARATION ROLLER CONFIGURATION

FIELD OF THE INVENTION

The present invention relates to an image scanner (hereinafter referred to as scanner) or the like image readers, or a copying machine or the like image forming devices. More specifically, the present invention relates to an image reader which reads images without being affected by dispersed paper dusts or toner particles at the reading section, and a sheet feeder which avoids overlaid supply of sheets.

BACKGROUND OF THE INVENTION

In a certain type of scanner where a mother document sheet moves to be read, the sheet sent out from a stack of sheets kept in a hopper is scanned while it passes across a reading glass plate provided in a reading line. The images on a mother document sheet are read out by an optical scanning system to be converted into electronic data.

Since the sheets are transferred at a relatively high speed, paper dust and fine toner particles are readily generated therefrom and disperse, such fine dust are attracted electrostatically onto the surface of the reading glass plate and the platen roller guiding the sheets. When the sheets are scanned for reading, the particles and dust ill-affect the image quality substantially, resulting in disturbing black lines or white-outs on a scanned image.

An image reader is provided with a sheet feeder for feeding sheets stacked in a hopper to the reading section. The sheet feeder picks up a sheet for delivery, one by one from the uppermost sheet of the stack. Most of the sheet feeders are equipped with a mechanism for preventing overlaid supply of sheets caused by mutual friction among the sheets. A sheet feeder having such a mechanism for preventing the overlaid sheet supply has been disclosed in Japanese Patent Laid-open Publication No. 4-286558.

FIG. 20 shows a schematic concept of a conventional sheet feeder. The sheet feeder as disclosed in the above-described laid-open patent is structured almost the same.

Referring to FIG. 20, a hopper 10 for holding mother document sheets or the like sheets P is provided at the reference end of a reading line, and a supply roller 20 is provided just above the hopper 10 for picking up the uppermost sheet for delivery. The hopper 10 is pushed upward by the force of a spring 30 so that the stack of sheets P is pressed to make contact with the supply roller 20. Because of friction with the roller surface, only a sheet located at the uppermost layer of the stack is sent out and delivered. Even when the stacking height of the sheets P varies, the spring 30 maintains the pressing force towards the supply roller 20 at substantially the same level.

At the outgoing side of the hopper 10, transfer rollers are provided, for example, in three stages 40, 50 and 60, for carrying the sheet P to the reading position. The sheet P coming out of the hopper 10 is nipped and pulled by the rollers for transfer. Between the hopper 10 and the first stage transfer rollers 40, a separation roller 70 and a retardation roller 80 are provided as means for preventing overlaid sheet transfer.

The overlaid sheet transfer prevention mechanism formed of the rollers 70 and 80 has been known among the image readers and the copying machines. The roller 80 is attached via a torque limiter 100 around a main shaft 90, which is driven by a driving motor (not shown) in a direction as indicated with an arrow in the drawing. The main shaft 90 is coupled with a driving motor (not shown), which is shared in common with the roller 70. The main shaft 90 is pushed upward (in FIG. 20) by a spring, in order to provide a nipping force in combination with the roller 70. The torque limiter 100 works as such: when one of the sheets P is sent out from the supply roller 20, the roller 80 revolves in compliance with the revolving torque of the roller 70 to carry the sheet forward; whereas, when two or more overlaid sheets P are sent out, the roller 80 revolves in the direction as indicated with an arrow to push the lower of the overlaid sheets back to the hopper 10.

In the above-described conventional mechanism, however, the supply roller 20 always stays on the stacked sheets P held in the hopper 10 and maintains contact thereon. Such an arrangement may impair the full functioning of the anti-overlaid transfer mechanism formed with the roller 70 and the roller 80. Namely, if the supply roller 20 is always in contact with the sheet P, it narrows the functioning range of the anti-overlaid transfer performance implemented by taking advantage of the relative relationship between the pressing force of roller 80 and the slip torque. It is difficult for the conventional mechanism to provide an optimized anti-overlaid transfer operation; as the result, the reliability in the prevention of overlaid sheet transfer is limited.

Furthermore, the conventional roller 80 uses a torque limiter 100 of fixed torque value, for which the operating torque cannot be changed.

Meanwhile, various kinds of document sheets come to the image scanners or the like devices; the sheets widely varying in the material, the thickness and the friction coefficient.

The sheet to sheet friction coefficient $\mu$ ranges approximately from 0.3–0.7. The high $\mu$ papers are liable to cause the overlaid sheet transfer. In order to prevent the overlaid sheet transfer with the high $\mu$ papers, the roller 80 needs to have a high retardation torque and the contact pressure also needs to be high. However, the roller 80 provided with the above-described torque and pressure is likely to induce overlaid sheet transfer with the low $\mu$ papers, and the papers might suffer from substantial damage.

Thus, the torque limiter 100, whose operating torque is fixed and invariable, may not be able to provide a sufficient anti-overlaid sheet transfer mechanism, working in combination with the roller 70. If an overlaid sheet transfer happens even once in an image scanner, where a number of mother document sheets are read out into the form of electronic data, the data are stored as they are and the stored data remain incomplete and defective. Thus the overlaid sheet transfer is a serious problem to be solved.

The present invention aims to offer an image reader, in which the reading glass plate and the platen roller are prevented from attracting paper dust and toner particles in order to read out quality images without being influenced thereby.

The present invention also aims to offer a sheet feeder used for image reading devices, which eliminates the overlaid transfer of document sheets for a number of sheets.

SUMMARY OF THE INVENTION

An image reader in accordance with the present invention comprises a reading glass plate facing an optical scanning system for reading a mother document sheet and a platen roller provided opposite to the reading glass plate. In the image reader, the reading glass plate is provided with an electro-conductive treatment on the surface and is grounded, and the platen roller is provided with a grounded electricity escaping brush making contact thereon.

In the image reader of the present invention, sticking of paper dust and toner particles on the reading glass plate and the platen roller can be prevented, enabling reading of a high quality image.

Furthermore, the image reader of the present invention is equipped with a sheet feeder, which comprises:

a first separation roller provided in the middle as viewed in the sheet transfer direction, second and third separation rollers provided respectively at the right and the left of the first separation roller, a retardation roller which nips the sheet in cooperation with the first separation roller, and prevents overlaid transfer of the sheets by taking advantage of a built-in torque limiter, and a pair of corrugation rollers provided on the shaft of the retardation roller at locations, respectively, corresponding to a place between the first separation roller and the second separation roller and a place between the first separation roller and the third separation roller.

The corrugation rollers are eccentric to the shaft, and they can make intrusion into spaces between the first, second and third separation rollers, after the first separation roller and the retardation roller nip the sheet.

A sheet separation mechanism in accordance with the present invention offers an ideal sheet separation through an optimized combination of advantages of the retardation roller and the corrugation roller and compensation of each others' weak points.

A sheet feeder in accordance with the present invention is further provided with a mechanism which temporarily lifts the supply roller from the sheet surface, after the separation roller and the retardation roller nip the sheet.

A sheet feeder in accordance with the present invention is further provided with a plurality of torque limiters each having different torque value set therein disposed between a retardation roller and a shaft for driving the retardation roller, means for switching the torque limiters and means for detecting thickness of the sheet nipped by the rollers. Namely, the switching means switches in accordance with thickness of the sheet.

In the present invention, a certain specific torque limiter is automatically selected in accordance with the thickness of the passing sheet among the plurality of torque limiters to be working for the retardation roller. Thus, a torque value for the retardation roller is adjusted in order to prevent overlaid sheet transfer with a high reliability.

Still further, a torque value for the retardation roller can be adjusted to be suitable to a certain specific sheet material. Thus, the prevention of overlaid sheet transfer can be implemented for various kinds of sheet materials.

As described above, a sheet feeder for image processing devices is provided in accordance with the present invention, with which the overlaid sheet transfer can be avoided with a high reliability.

BRIEF DESCRIPTION OF THE DRAWINGS

FIG. 4(a) is a cross sectional view taken along line A—A of FIG. 3.

FIG. 4(b) is a cross sectional view taken along line B—B of FIG. 3.

FIG. 5(a) is a cross sectional view of the mechanism showing a state when the sheet is nipped by the separation roller and the retardation roller.

FIG. 5(b) is a cross sectional view of the mechanism showing a state when the corrugation roller and the separation roller are in an overlapped position.

FIG. 19 is a switching timing chart showing the torque set for a retardation roller.

DETAILED DESCRIPTION OF THE INVENTION

First Embodiment

Figure 1:
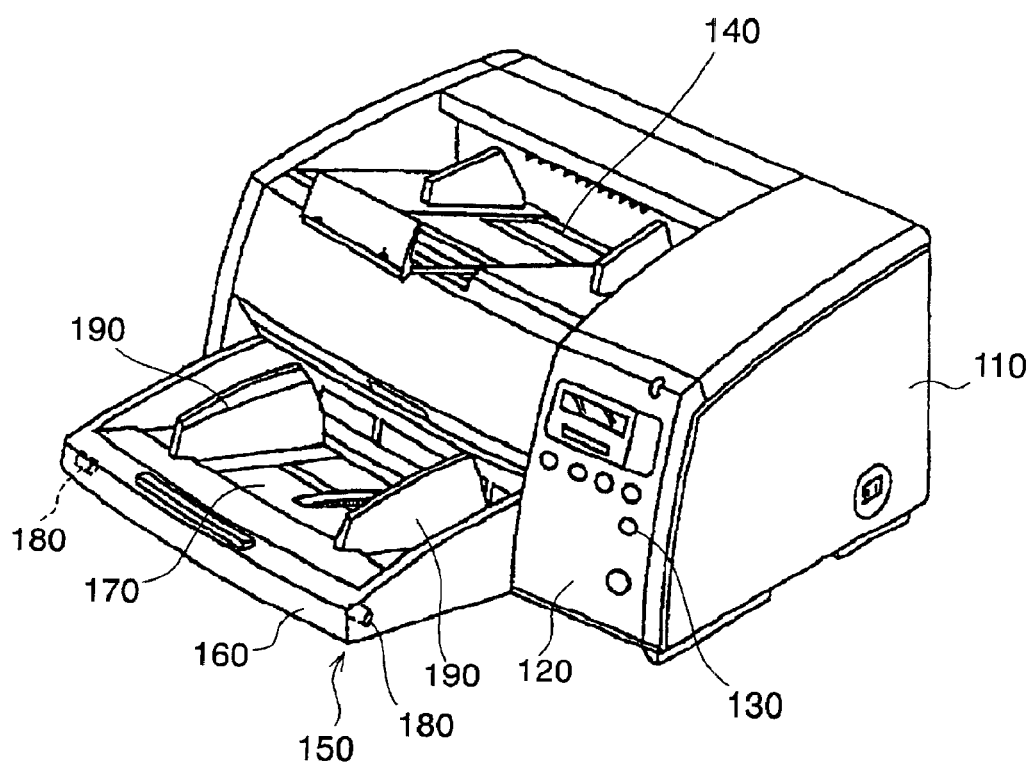
FIG. 1 is a schematic perspective view of an image scanner which incorporates a sheet supply mechanism in accordance with the present invention.

A first exemplary embodiment of the present invention is described referring to the drawings. An image scanner, which reads images out of a mother document sheet and stores them in an electronic file, is used as an example for describing the present embodiment.

FIG. 1 is a perspective view showing a schematic structure of an image scanner equipped with a sheet feeder in accordance with the present invention. In the present example, paper is used to represent one of the sheet materials.

The image scanner is formed of a main body 110 containing an optical reading system and a sheet transfer path, and means for supplying the sheets, or an automatic sheet feeder 150. The main body 110 has an operation panel 120 in the front and a controller (not shown) inside for controlling the entire operation. Provided on the top of the main body 110 is a sheet recollection tray 140, which recollects mother document sheets supplied from the automatic sheet feeder 150 and read by the reading system.

The automatic sheet feeder 150 functions both as a hopper for supplying the sheets to the transfer path within the main body 110, and for preventing an overlaid sheet transfer.

Figure 2:
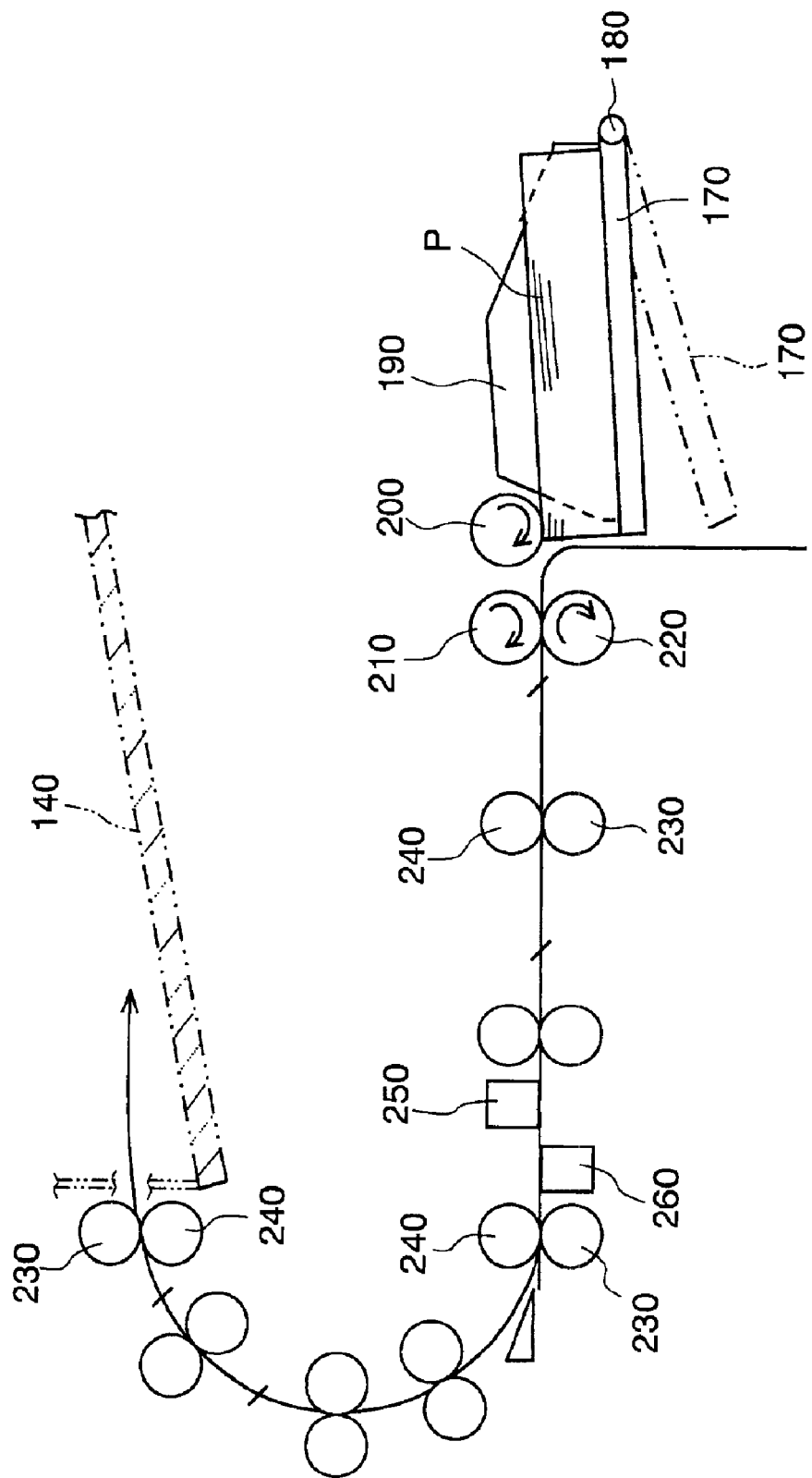
FIG. 2 is a concept illustration of a sheet path, from a hopper of an automatic sheet feeder to a sheet recollection tray.

FIG. 2 shows a schematic view of a sheet passing route, starting from the hopper of the automatic sheet feeder, via the transfer path, to the sheet recollection tray.

The automatic sheet feeder 150 is attached to a housing 160 so that a hopper 170 can revolve up and down around a hinge pin 180. The hopper 170 is driven by an actuator (not shown) to move around the hinge pin 180. Namely, the mother document sheets P stacked in the hopper 170 are pushed upward until they get in contact with a supply roller 200 which is provided at a fixed position above the hopper 170. On the upper surface of the hopper 170, a pair of guides 190 is provided for guiding the sheets P in the width direction.

At a location downstream of the supply roller 200, which picks up the sheets in the hopper 170 one by one for delivery, a pair of rollers including a separation roller 210 (S roller) and a retardation roller 220 (R roller), are provided for avoiding overlaid transfer of the sheets P. Between the pair of rollers and the recollection tray is a transfer path for the sheets P. In the transfer path, couples of transfer rollers 230, 240 are provided for a plurality of stages for nipping the sheet P and transferring it. In the transfer path, a first scanning sensor 250 is provided for reading the images on the upper surface of a mother document sheet, and a second scanning sensor 260 is provided for reading the images on the bottom surface of the mother document sheet. One sheet P picked up by the supply roller 200 from the hopper 170 passes along the transfer path, it is scanned by the first and the second scanning sensors 250, 260 for reading the images, and then discharged to the sheet recollection tray 140.

Referring to FIG. 2, the R roller 220 is provided with a torque limiter, and the R roller is normally revolving in a direction reverse to the direction of sheet transfer for avoiding the overlaid transfer of sheets P.

Besides the above-described overlaid sheet transfer protection mechanism consisting of the roller 210 and the roller 220, there has been another known mechanism that uses a corrugation roller (C roller), in place of the roller 210, for providing a corrugation on sheet P. The C roller aims to facilitate an easy separation of the sheets P, by providing, during the transfer, a gap among the sheets by means of the corrugation.

The R roller 220 with torque limiter shown in FIG. 2 and the C roller respectively have their own specific characteristics, in the sheet separation performance, in the paper dust generation, etc. Namely, in terms of the sheet separation, the C roller is superior to the R roller 220. When it comes to the sheets P of high friction coefficient, or those sticking to each other by static electricity, the sheet separation capability significantly deteriorates with the R roller 220, while the C roller shows hardly any deterioration. In terms of the paper dust generation, the R roller 220 generates less dust, while the C roller generates much. In terms of damage to the sheet P, less damage is caused with the R roller 220, while the C roller cause more damage.

Thus, each of the R roller with torque limiter and the C roller has its own specific advantages and disadvantages, in terms of the sheet separation characteristic, the paper dust generation and the damage to the sheets.

The present invention aims to provide a sheet separation mechanism that provides an optimized sheet separation performance by combining the respective advantages and compensating for the disadvantages of the R roller with the torque limiter and the C roller.

In the following, an exemplary embodiment of the present invention is described referring to the drawings.

Figure 20:
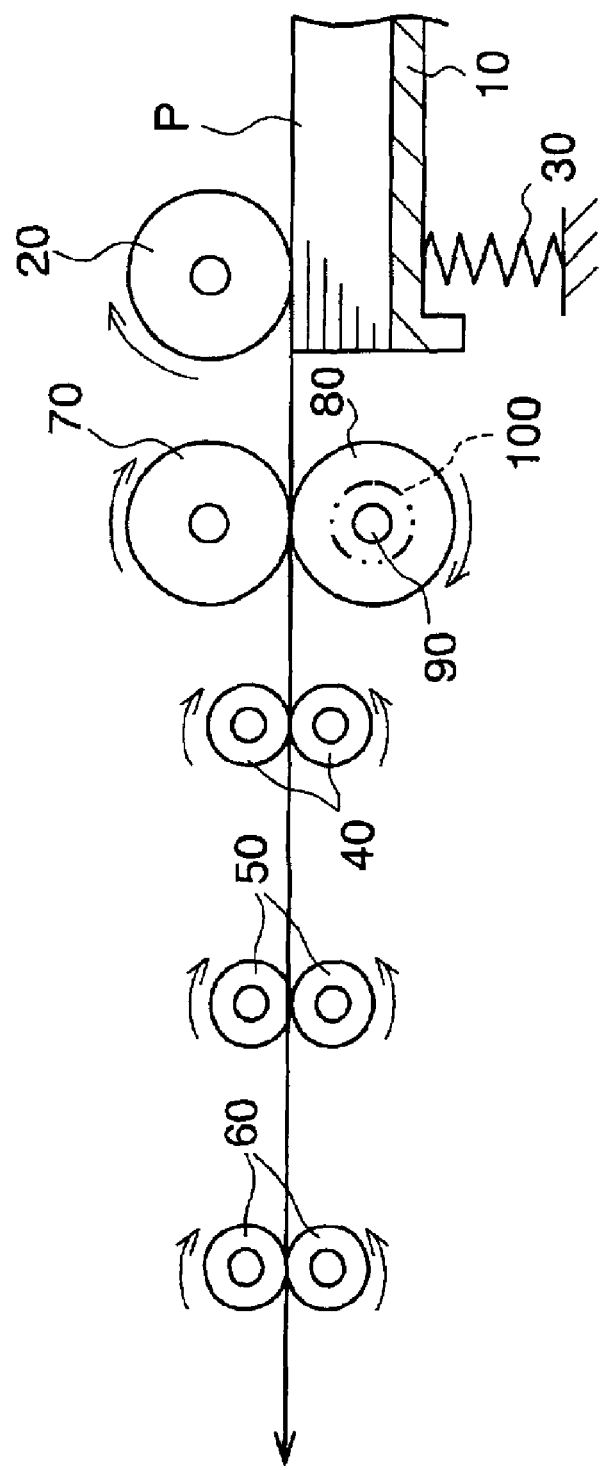
FIG. 20 is a schematic view showing an outline concept of a prior art sheet feeder.

In FIG. 4(a), a supply roller 310 is provided above a hopper (not shown) storing stacked sheets P, and an S roller 270 and an R roller 320 containing a torque limiter are provided down stream of the sheet supply. The relative positioning among the supply roller 310, the roller 270 and the roller 320 remains the same as that shown in FIG. 20, which illustrates conventional technology. The supply roller 310 sends out the uppermost sheet of the stacked sheets kept in the hopper, along the sheet supply direction.

Figure 3:
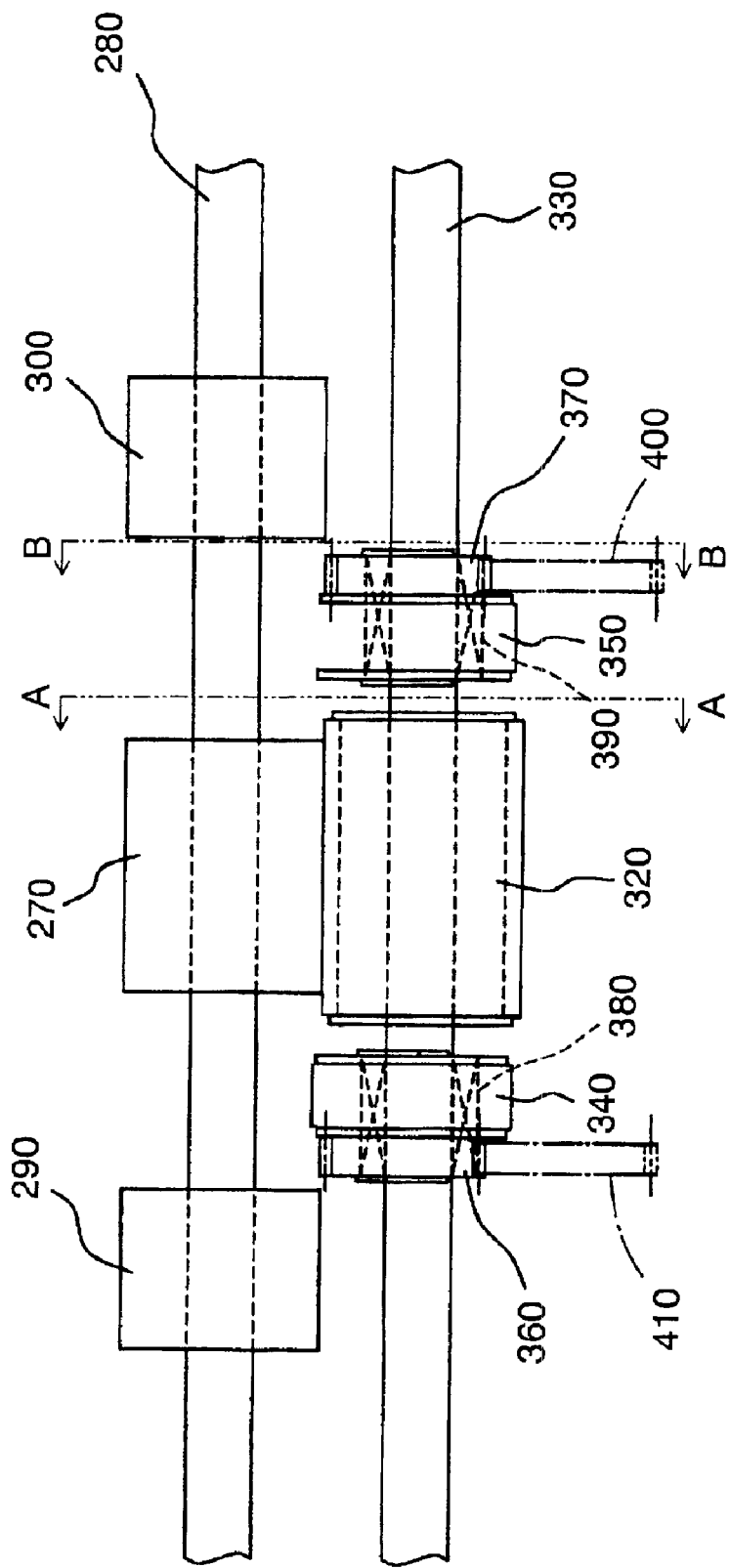
FIG. 3 is a front view of a sheet separation mechanism in an image forming device in accordance with the present invention, as viewed in the direction of sheet supply.
Figure 6:
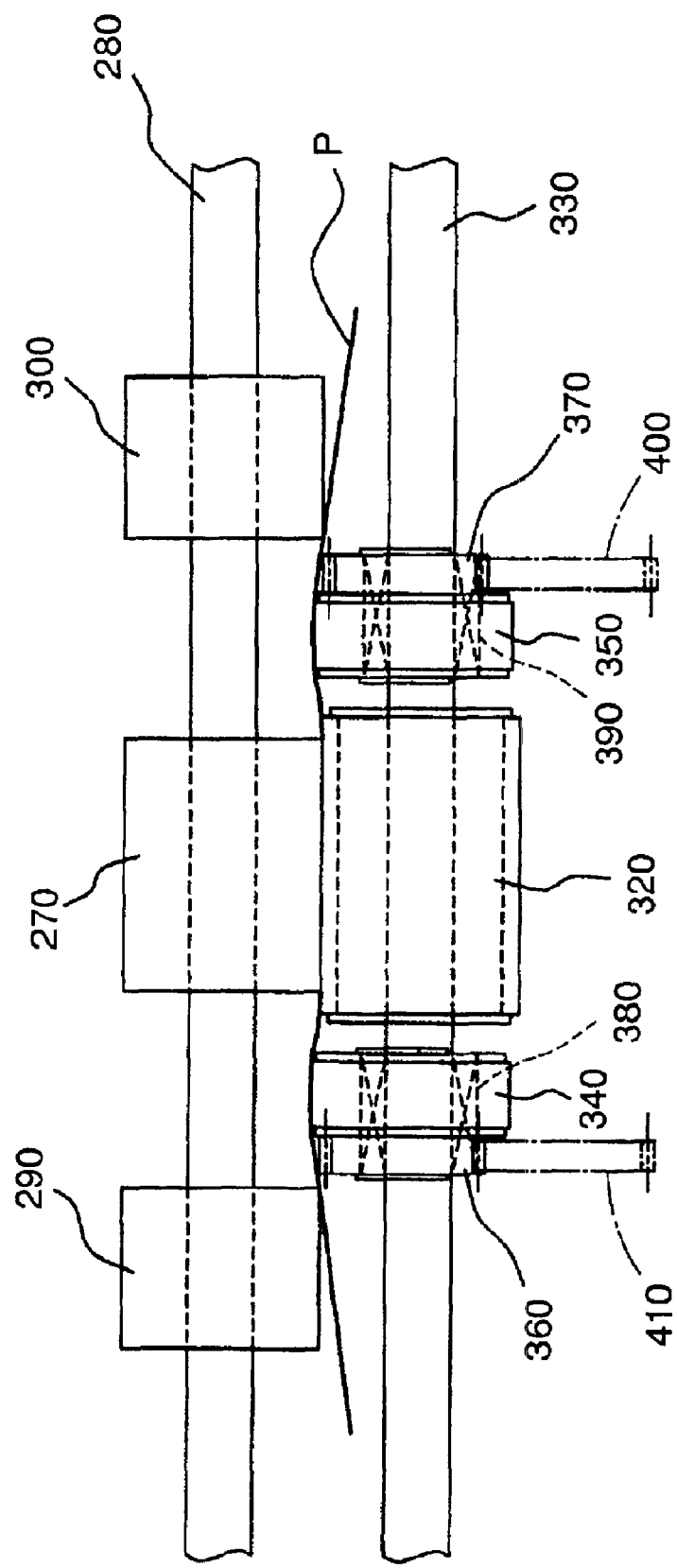
FIG. 6 is a front view of a sheet separation mechanism showing effectiveness of the sheet separation conducted by the corrugation roller.

The first S roller 270 is fixed on a revolving drive shaft 280 as shown in FIG. 3, and a second S roller 290 and a third S roller 300 are provided fixed likewise at the right and the left of the first S roller 270 keeping a certain clearance between each other. The first, the second and the third S rollers 270, 290, 300 have equal outer diameters, and revolve in the same direction as the supply roller 310, as shown in FIG. 4(a).

The roller 320 is attached on the revolving drive shaft 330 via the torque limiter (not shown), and normally revolving in a direction reverse to the sheet supply direction, as shown in FIG. 4(a). When one sheet P is nipped by the roller 270, the roller 320 makes ancillary revolution, influenced by the friction with the sheet P, in the same direction as the sheet supply direction. When two or more sheets P are nipped, the roller 320 is driven by the torque limiter to make the revolution as indicated with an arrow in FIG. 4(a). The bottom sheet among the overlaid sheets P is sent back to the hopper. Such operational behavior shown by the roller 320 containing the torque limiter is the same as that which has been known with the conventional mechanism.

Provided on a shaft 330 are a pair of C rollers 340, 350, with the roller 320 in the middle an a certain clearance between each other. The rollers 340, 350 are eccentric to the shaft 330, while gears 360, 370 attached and fixed to the rollers are coaxial to the shaft 330. Both the rollers 340, 350 and the gears 360, 370 can revolve around the shaft 330, which is supported by bearings 380, 390. The roller 340 is disposed at a location corresponding to a place substantially in the middle between the roller 270 and the roller 290, while the roller 350 is at a location corresponding to a place substantially in the middle between the roller 270 and the roller 300.

As shown in FIG. 4(b), the gear 370 integrated with the roller 350 is coupled with a driving gear 400, which drives the roller 350 so that it revolves freely around the shaft 330 independently. The roller 340 is structured likewise; such counterpart portions are indicated in FIG. 4(b) with reference numerals in the parenthesis. The roller 350 is shaped to be eccentric relative to the shaft 330, as shown in FIG. 4(b), which shows the initial state before start of the sheet supply. The roller 340 is also eccentric relative to the shaft 330, and revolves in synchronization with the roller 350. The gear 360 integrated with the roller 340 is driven by a driving gear 410, the reference numerals are shown in the parenthesis in FIG. 4(b).

In the above-described configuration, as soon as an instruction is issued to supply a sheet P out of the stack kept in the hopper, the supply roller 310, the roller 270 and the roller 320 start revolving in the directions as indicated with arrows in FIG. 4(a). The rollers 290, 300 fixed on the shaft 280 also revolve in the same direction as the roller 270. The rollers 340, 350 stay in the position as illustrated in FIG. 4(b), as long as the respective driving gears 400, 410 are stopped.

Therefore, the front edge of sheet P moves to a nipping point formed by the roller 270 and the roller 320, and makes contact with the surface of the rollers 290, 300. If two or more overlaid sheets are supplied, the bottom sheet of the overlaid sheets P is sent back towards the hopper, since the roller 320 is revolving in a direction opposite to the direction of sheet transfer, as shown in FIG. 4(a).

If, in the present embodiment, a combined action of the roller 270 and the roller 320 fail to prevent an overlaid transfer of the sheet P, it is compensated for by a sheet separating function performed by the rollers 340, 350. Namely, when the front edge of sheet P nipped by the roller 270 and the roller 320 passes through the nip zone, the driving gears 400, 410 are put into action. The revolving action of the driving gears 400, 410 shifts the state of eccentric rollers 340, 350 to a position as shown in FIG. 5(b).

In this position, the top ends of the rollers 340, 350 come higher than the nipping level formed by the roller 270 and the roller 320, making a slight intrusion into a space between the roller 270 and the roller 290, as well as a space between the roller 270 and the roller 300. Therefore, the sheet P is provided with a moderate undulation. If two overlaid sheets P are supplied, the undulation weakens a mutual sticking property among the sheets. Thus the overlaid sheets P are separated, and the roller 320 can send the overlaid sheet quickly back to the hopper.

As soon as the sheet P passes through the nip zone, the driving gears 400, 410 restore the rollers 340, 350 to the initial position as shown in FIG. 4(b) to be prepared for the next sheet P.

As described above, since the rollers 340, 350 provide the sheet P with an additional separating effect after it is nipped by the roller 270 and the roller 320, the overlaid sheet transfer prevention, which was conducted by the roller 320 alone in the prior art, is well compensated.

Furthermore, since the rollers 340, 350 make contact with the sheet P only for a short period of time after it is nipped by the roller 270 and the roller 320, generation of paper dust is suppressed to be less as compared with the conventional cases where the rollers 340, 350 are always in contact with the sheet. Also, since a forced bending is effected on the sheet only for a short period of time, less damage is caused to the sheet.

In accordance with the present invention, the C roller shifts its position, after the sheet is nipped by the S roller and the R roller, to provide the sheet with an undulation. Therefore, the mutual sticking among the overlaid sheets is degraded, and the R roller can work to prevent the overlaid sheet transfer with high reliability.

Second Embodiment

A second exemplary embodiment of the present invention is described with reference to the drawings.

Figure 7:
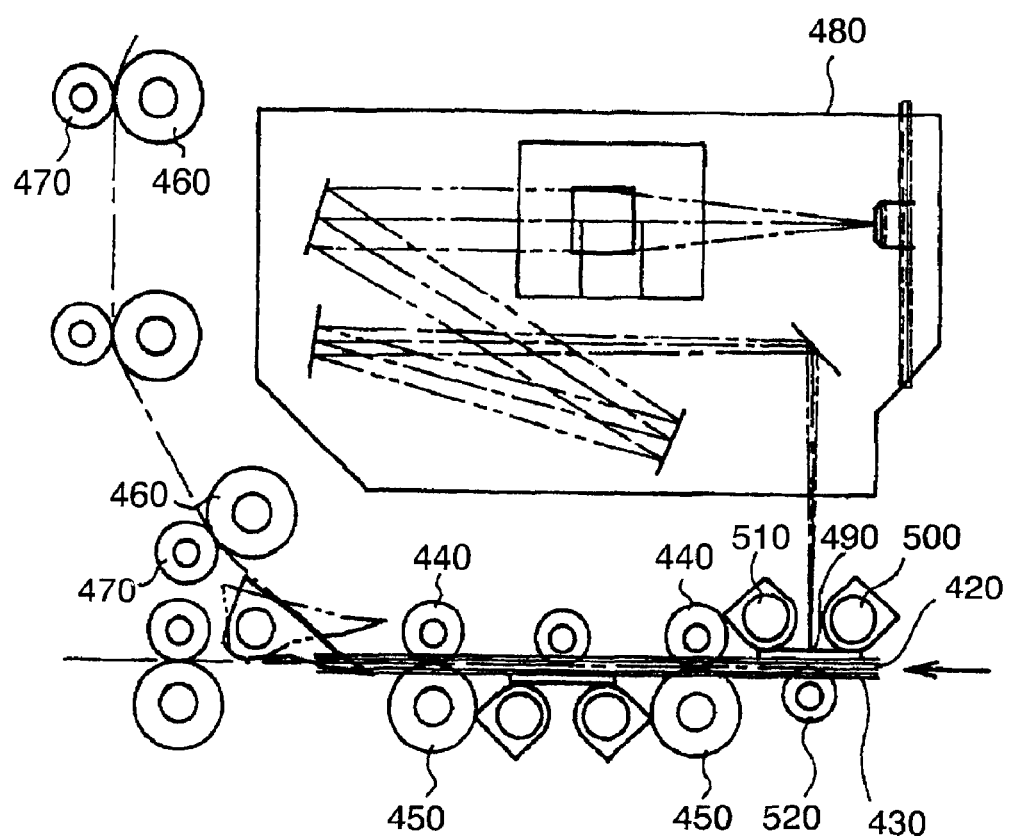
FIG. 7 is a schematic view showing the key portion of an image reader in accordance with the present invention.

FIG. 7 shows a schematic view of a key portion of an image reader in accordance with the present invention.

In FIG. 7, a pair of guide frames 420, 430 is disposed with a certain gap in the vertical direction for guiding a document sheet supplied from a hopper (not shown) to a direction as indicated with an arrow. Along with the guide frames 420, 430, pairs of transfer rollers 440, 450 are provided. Also in the downstream of the guide frames 420, 430, pairs of transfer rollers 460, 470 are provided. A sheet is nipped by the pairs of these transfer rollers 460, 470 to be carried forward in the direction of discharge.

Provided above the guide frames 420, 430 is an optical scanning unit 480. A reading glass plate 490 is provided in the guide frame 420 crossing the beam path of the optical scanning unit 480. Light sources 500, 510 are provided in the vicinity of the reading glass plate 490. Provided under the reading glass plate 490 is a platen roller 520, which makes contact with the sheet to carry it forward.

Figure 8:
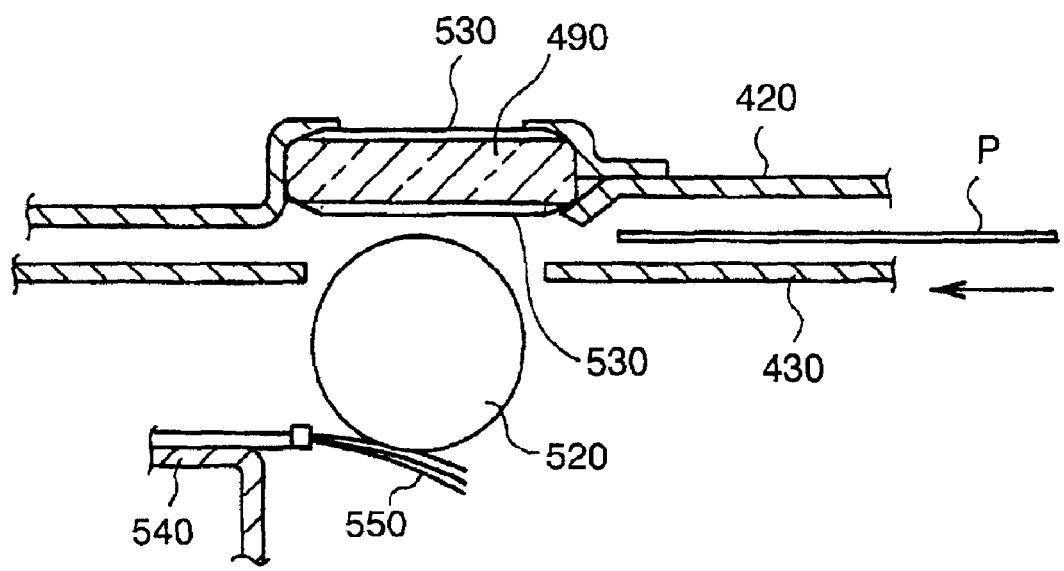
FIG. 8 is a vertical cross sectional view showing a key portion of a reading glass plate and a platen roller.

FIG. 8 is a vertical cross sectional view showing the key portion of the reading glass plate 490 and the platen roller 520.

The reading glass plate 490 is surface treated with an electro-conductive treatment, and treated surface is electrically connected with the guide frame 420 made of metal. The guide frame 420 is grounded via a chassis (not shown) of an image reading device. The electro-conductive treatment on the surface of the reading glass plate 490 is given by forming a transparent metal layer, or a conductive metal oxide layer, 530 through vacuum deposition or by a CVD process.

The platen roller 520 is made of metal. A frame 540 is provided in the neighborhood, which is grounded via a chassis of the image reading device. An electricity escaping brush 550 is fixed at the root section with the electrical conduction to the frame 540. The electricity escaping brush 550 makes contact at the other end with the surface of the platen roller 520, and electrical charges on the platen roller 520 is discharged to the ground through the electricity escaping brush 550.

A sheet P coming from the hopper moves between the guide frames 420, 430 in the direction indicated by an arrow in FIG. 8. When it passes through a space formed by the reading glass plate 490 and the platen roller 520, the optical scanning unit 480 reads out the images carried on the sheet P.

The reading glass plate 490 is provided with an electro-conductive surface, which is grounded via the guide frame 420. So, the electrostatic charge on the surface of the reading glass plate 490 is immediately discharged to the ground. Therefore, paper dust and fine toner particles generated from the travelling sheet P are not attracted on the reading glass plate 490 by static electricity. Since the platen roller 520 is also grounded through the electricity escaping brush 550, it does not attract the paper dust or the fine toner particles, either. Thus the paper dust and the toner particles generated from the travelling sheet P do not stick on the reading glass plate 490 or the platen roller 520; therefore, an image reader in accordance with the present invention can read out high quality images without being affected by black lines or white-outs.

In an image reader in accordance with the present invention, the reading glass plate and the platen roller do not have paper dust or toner particles sticking electro-statically on the surface. Therefore, it can read images on the sheet clearly, and the image quality is not impaired by the foreign materials sticking on the surface.

Third Embodiment

A third exemplary embodiment of the present invention is described with reference to the drawings.

Figure 9:
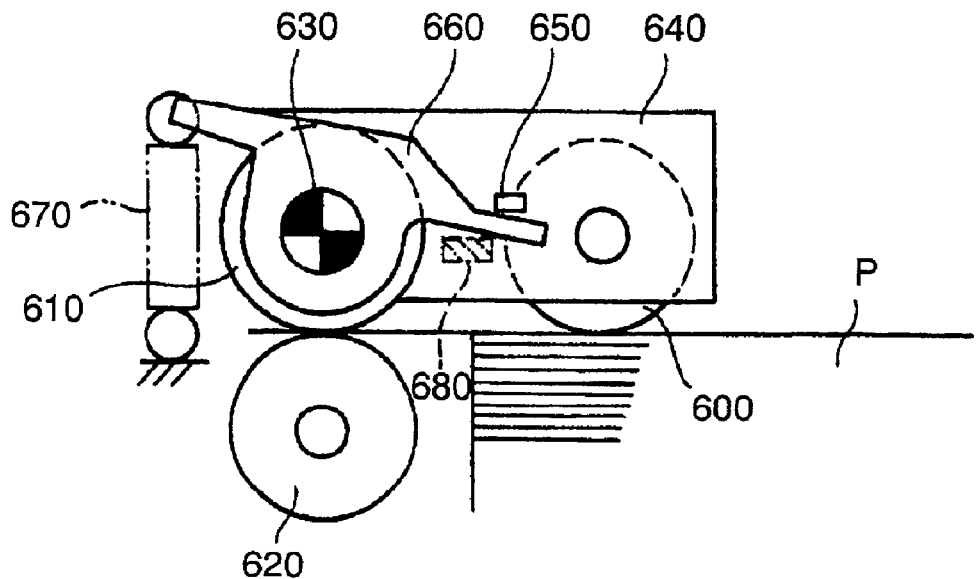
FIG. 9 is a side view showing a key portion of a sheet supply mechanism in accordance with the present invention.

As shown in FIG. 9, a sheet feeding mechanism in the present embodiment is formed of a combination of a supply roller 600, an S roller 610 and a retardation roller 620. These rollers 600, 610 and 620 are disposed in the same arrangement as in FIG. 20, and are located above a hopper (not shown) for holding sheets P. Transfer rollers (not shown) are provided for a plurality of stages in the downstream of the roller 610 and the roller 620, which discharge the sheets P after they pass through a reading section, for example in the case of a scanner.

The roller 620 is provided with a torque limiter, which works in the following manner. Normally it revolves in a direction opposite to the sheet supply; when the roller 610 nips one sheet P it begins to revolve in the sheet supply direction. Whereas, when two or more sheets are nipped, only the uppermost sheet is sent forward and the roller 620 pushes back the remainder to the hopper.

Figure 11:
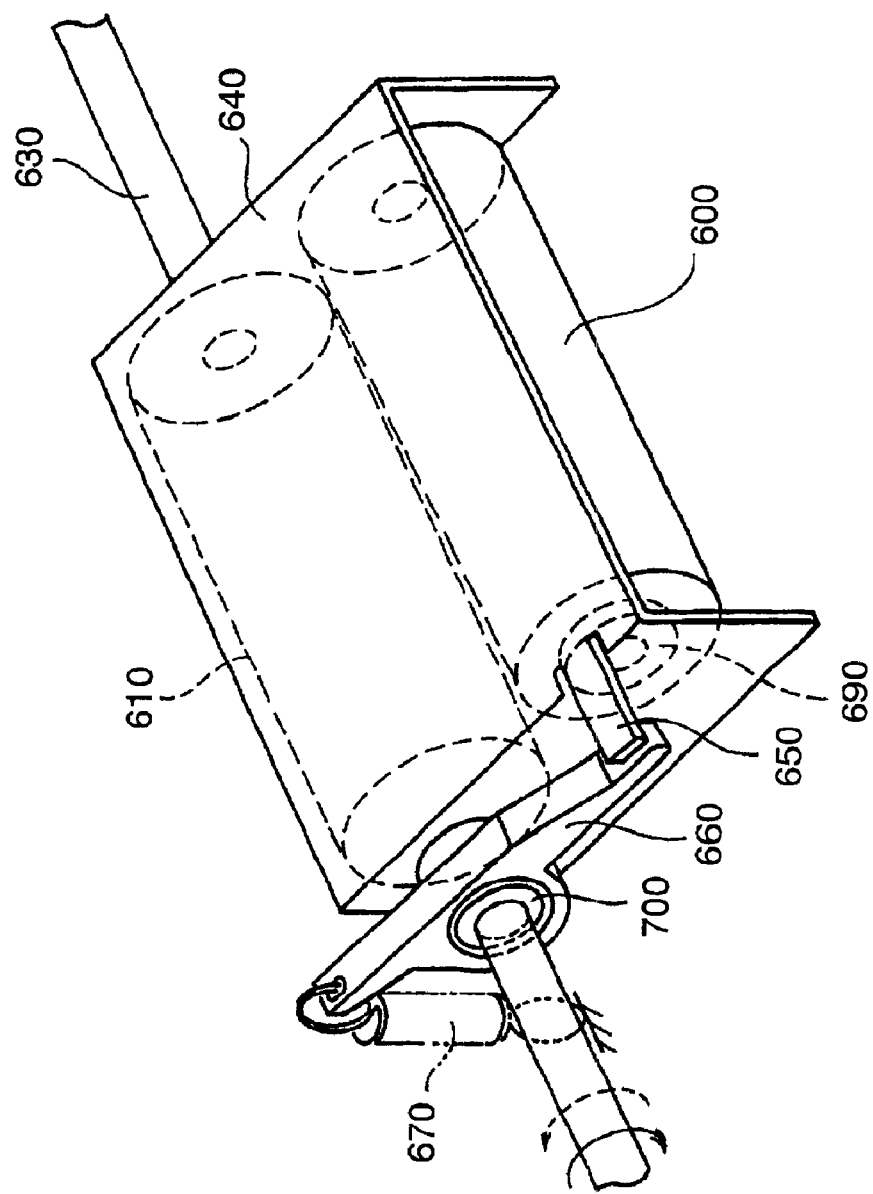
FIG. 11 is a schematic perspective view of the sheet supply mechanism, excluding the retardation roller.

Referring to FIG. 11, the roller 610 is provided so that it can revolve freely around a supply roller drive shaft 630 connected with a motor (not shown). Meanwhile, the roller 610 is coupled with another motor (not shown) to be able to revolve independently to the roller 600. The drive shaft 630 is attached on a holder 640 for holding the roller 600.

The holder 640 holds the roller 600, and revolution of the drive shaft 630 is conveyed to the roller 600 via a series of gears (not shown) coupling the roller 600 and the drive shaft 630. The roller 600 is provided with a one-way clutch 690 (shown in FIG. 11), so that it can revolve only in the sheet P transfer direction, irrespective of the revolving direction of the drive shaft 630.

Figure 10:
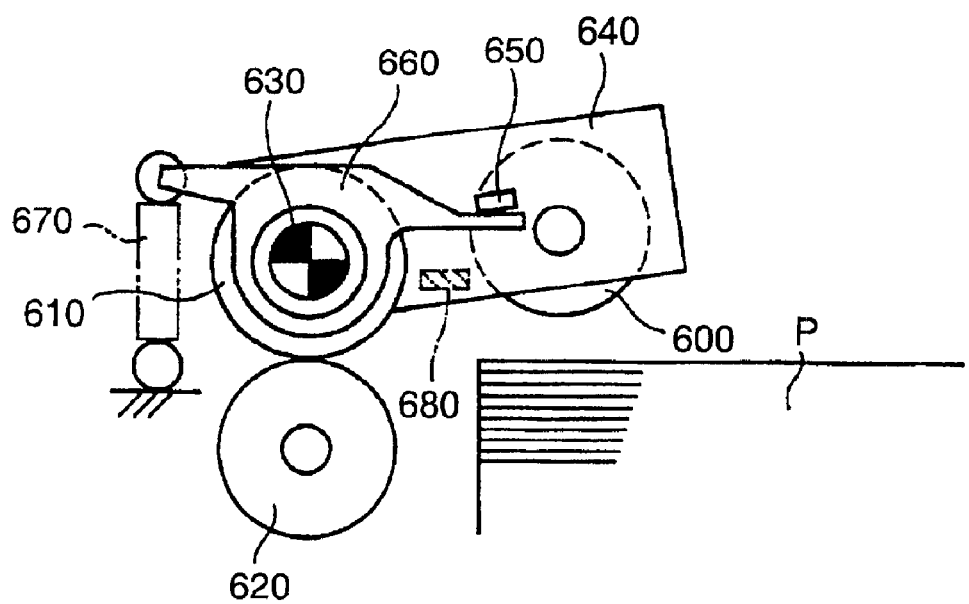
FIG. 10 is a side view showing a state when a holder is lifted for separating the supply roller from the stacked sheets.

The drive shaft 630 is coupled with a stop lever 660 which restricts the position of the holder 640. The lever 660 is provided around the drive shaft 630 via a torque limiter 700. The base end of lever 660 is fixed by a coil spring 670 to be pulled counter-clockwise around the drive shaft 630, as illustrated in FIG. 9 and FIG. 10. Other end of the lever 660 can make contact with a hook 650 provided in the holder 640. Torque value for the torque limiter 700 contained in the lever 660 is set to be greater than spring force of the coil spring 670.

In FIG. 11, when the drive shaft 630 is driven in the direction of the solid-line arrow, the roller 600 receives a revolving force via the series of gears so that the roller revolves in the direction of sheet P supply. At the same time, the stop lever 660, which is attached via the torque limiter 700 to the drive shaft 630, revolves clockwise (in FIG. 9) until it touches a stopper block 680 provided in the vicinity of the holder 640. The holder 640 so far restricted by the lever 660 via the hook 650 moves downward by its own weight, including the roller 600, around the drive shaft 630, and the roller 600 gets in touch with the upper surface of the stacked sheets P kept in the hopper. Then, the torque limiter 700 allows an idle revolution, and the drive shaft 630 keeps on driving the roller 600 to revolve in the sheet P supply direction.

On the other hand, when the drive shaft 630 is reversed in the direction of dotted-line arrow shown in FIG. 11, the lever 660 moves counter-clockwise. The lever 660 at the other end lifts the hook 650 up, and the holder 640 revolves to the state as shown in FIG. 10. The roller 600 is separated from the upper surface of the sheets P stacked in the hopper. Even when the drive shaft 630 is reversed, the revolving motion is conveyed to the roller 600. However, since the roller is provided with a one-way clutch 690 that allows the revolution only in the direction of sheet supply, the roller 600 is not reversed; therefore, the roller undergoes no action for pushing the sheet P back to the hopper.

In the above-described structure, while the roller 600 is making contact on the stack of sheets P kept in the hopper as illustrated in FIG. 9, the drive shaft 630 revolves in the direction of the solid-line arrow to drive the roller 600 in the direction for supplying the sheets P. Thus the sheet P is sent out of the hopper one after another by the roller 600. As soon as the roller 610 and the roller 620 nip the sheet P, and it is detected, the output shaft of the motor driving the drive shaft 630 is reversed.

The nipping of sheet P can be detected either by means of an optical sensor, or through detection of a displacement signal caused by a thickness of the sheet on the roller 610, or the roller 620.

The reversed revolution of the motor causes the drive shaft 630 to revolve in the direction of the dotted-line arrow shown in FIG. 11, and this revolution drives the lever 660 counter-clockwise, in FIG. 9, around the drive shaft 630. The other end of the lever 660 comes in contact with the hook 650 to lift the holder 640 upward as shown in FIG. 10. The supply roller 600 is parted from the upper surface of the sheets P stacked in the hopper. Now, the sheet being nipped by the roller 610 and the roller 620 becomes irrelevant to the roller 600, and the roller 600 becomes irrelevant to the operation for preventing overlaid sheet transfer. This state renders the preventive function more reliable. Namely, the supply roller 600 provides the sheet P with a send out force until it is nipped. However, as soon as the sheet P is nipped, the supply roller 600 lifts up to become free of influence on the sheet P.

Figure 12A:
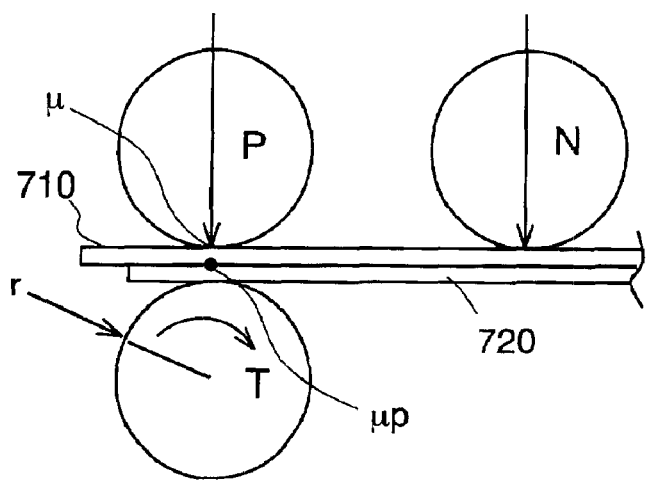
FIG. 12(a) is a cross sectional view of the mechanism showing a state where two sheets are transferred overlaid, in a combined mechanism of a supply roller, a separation roller and a retardation roller.
Figure 12B:
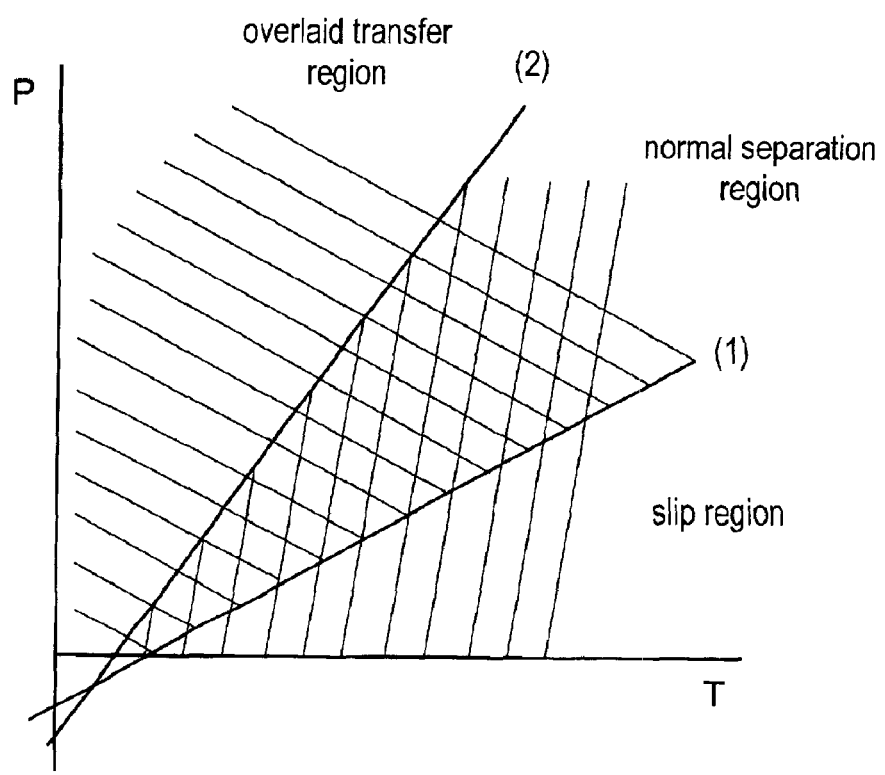
FIG. 12(b) is a chart showing a relation between the pressing force of the retardation roller and the slip torque.

FIGS. 12(a) and (b) are illustrations used to show how the prevention of overlaid sheet transfer works out. FIG. 12(a) illustrates a state where two overlaid sheet are being transferred, in a combined structure of the roller 600, the roller 610 and the roller 620. FIG. 12(b) shows a relation between the pressing force of the roller 620 and the slip torque.

In FIGS. 12(a) and (b), P is a pressing force of roller 620, N is a pressing force of supply roller 600, $\mu$ is a friction coefficient between roller 610 and sheet 710, $\mu$p is a friction coefficient between sheets 710 and 720, T is a slip torque of roller 620, and r is a radius of roller 620.

A pressing force P for the roller 620 to be able to avoid the overlaid sheet transfer needs to satisfy the following formulae (1), (2).

$$P > (T/r \cdot \mu) + (\mu p - \mu) \cdot N/\mu \quad (1)$$

$$P > (T/r \cdot \mu p) - 610 \quad (2)$$

The overlaid sheet transfer, the sheet separation and the slip, which are determined through the relation between the pressing force P of roller 620 and the slip torque T, are represented as the overlaid transfer region, the normal separation region, and the slip region in FIG. 12(b). The greater normal separation region signifies the more reliable prevention of the overlaid transfer. Accordingly, if the normal separation region is to be expanded, N should be made as close as zero.

As described earlier, the setting of N=0 is realized by lifting the holder 640 to separate the supply roller 600 from the sheet P, as shown in FIG. 10, after the sheet P is nipped by the roller 610 and the roller 620. This expands the normal separation region of FIG. 12(b) to a more reliable prevention of the overlaid sheet transfer.

In accordance with the present invention, the restricting condition of anti-overlaid sheet transfer can be widened by separating the supply roller from the sheet material. The operation of preventing the overlaid sheet transfer is thus conducted at a higher reliability.

Fourth Embodiment

FIG. 13(a) is a side view of a key portion, FIG. 13(b) is a schematic view showing a cam position when the torsion spring is wound slightly, FIG. 13(c) is that when the torsion spring is wound greatly.

As shown in FIG. 13(a), a supply roller 740 and an S roller 750 are attached respectively, so that they can revolve freely, on a frame 730, and the frame is fixed on the main body of device. A retardation roller 760 is attached on a base 770, which can revolve around a shaft 780 fixed within the main body. The base 770 is forced counter-clockwise around the shaft 780 by a pulling spring 810 hooked with the main body.

Referring to FIG. 13(b), the shaft 780 is fitted with a sleeve 790, which can revolve freely around the shaft. A torsion spring 820 is provided around the sleeve 790. The torsion spring 820 consists of a coiled portion 830 wound around the sleeve 790, and a hook arm 850 and a spring arm 840 each extruding from the coiled portion 830. The spring arm 840 is inserted in a hooking hole 800 provided in the base 770, while the hook arm 850 is in contact with the outer surface of a cam 860, which is provided for adjusting the spring force.

Figure 13:
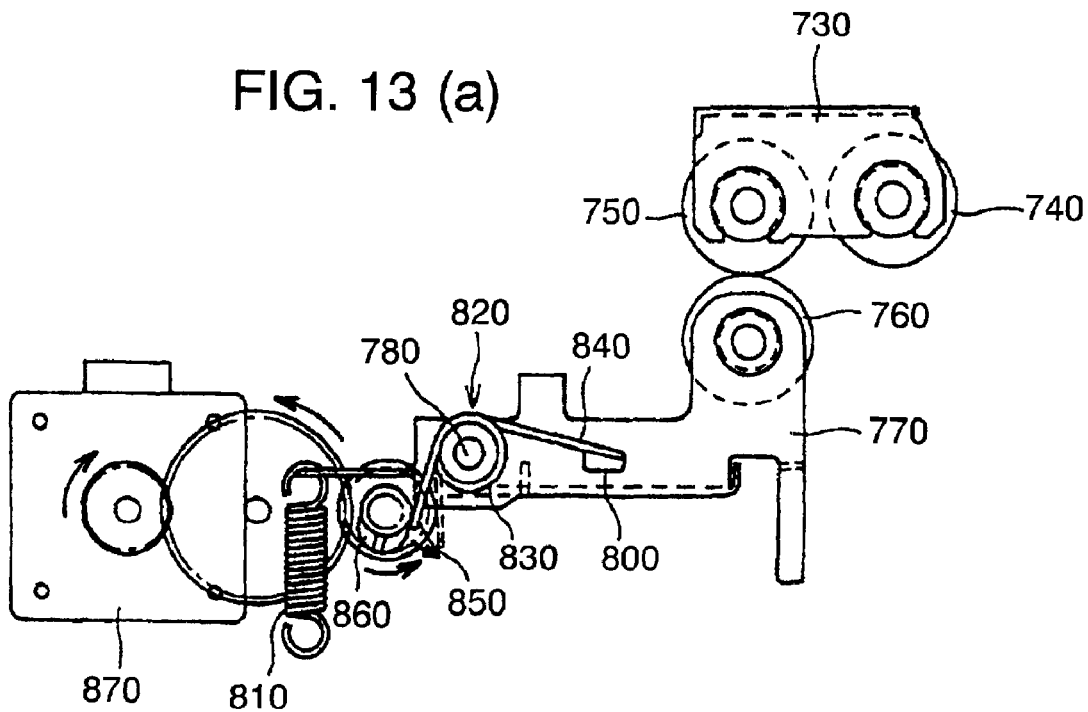
FIG. 13(a) is a side view of a key portion of the mechanism.
FIG. 13(b) is a schematic view showing a position of a cam in a state where winding of a torsion spring is slight.
FIG. 13(c) is a schematic view showing a position of the cam in a state where winding of the torsion spring is great.
Figure 13:
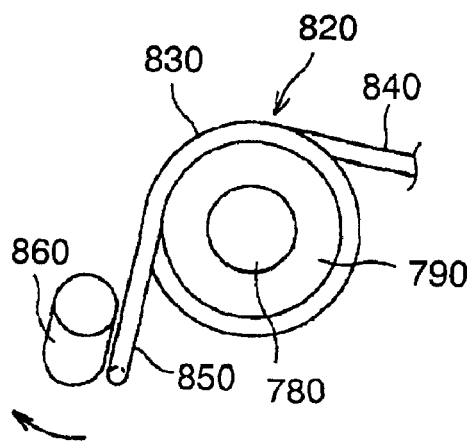
Figure 13:
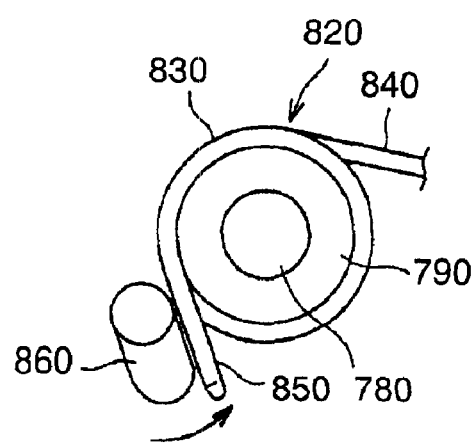

The cam 860 is coupled with a driving motor 870 to be driven in the directions as shown in FIGS. 13(b) and 13 (c). In FIG. 13(b), the hook arm 850 is being bent to a less degree by the cam 860, and accordingly, the coil portion 830 is wound less. As a result, the spring arm 840 provides the base 770 with a small upward force. When the cam 860 is shifted in the direction of an arrow in FIG. 13(c), the coil portion 830 gets much winding, and the spring force given by the spring arm 840 to the base 770 increases accordingly.

Thus, the spring force of the spring 820 can be changed by driving the cam 860 using the motor 870, in accordance with the present embodiment. As the result, the pressing force of roller 760 towards roller 750 can be made stronger or weaker, and the force of nipping the sheet P may be set at any desired level.

Figure 14:
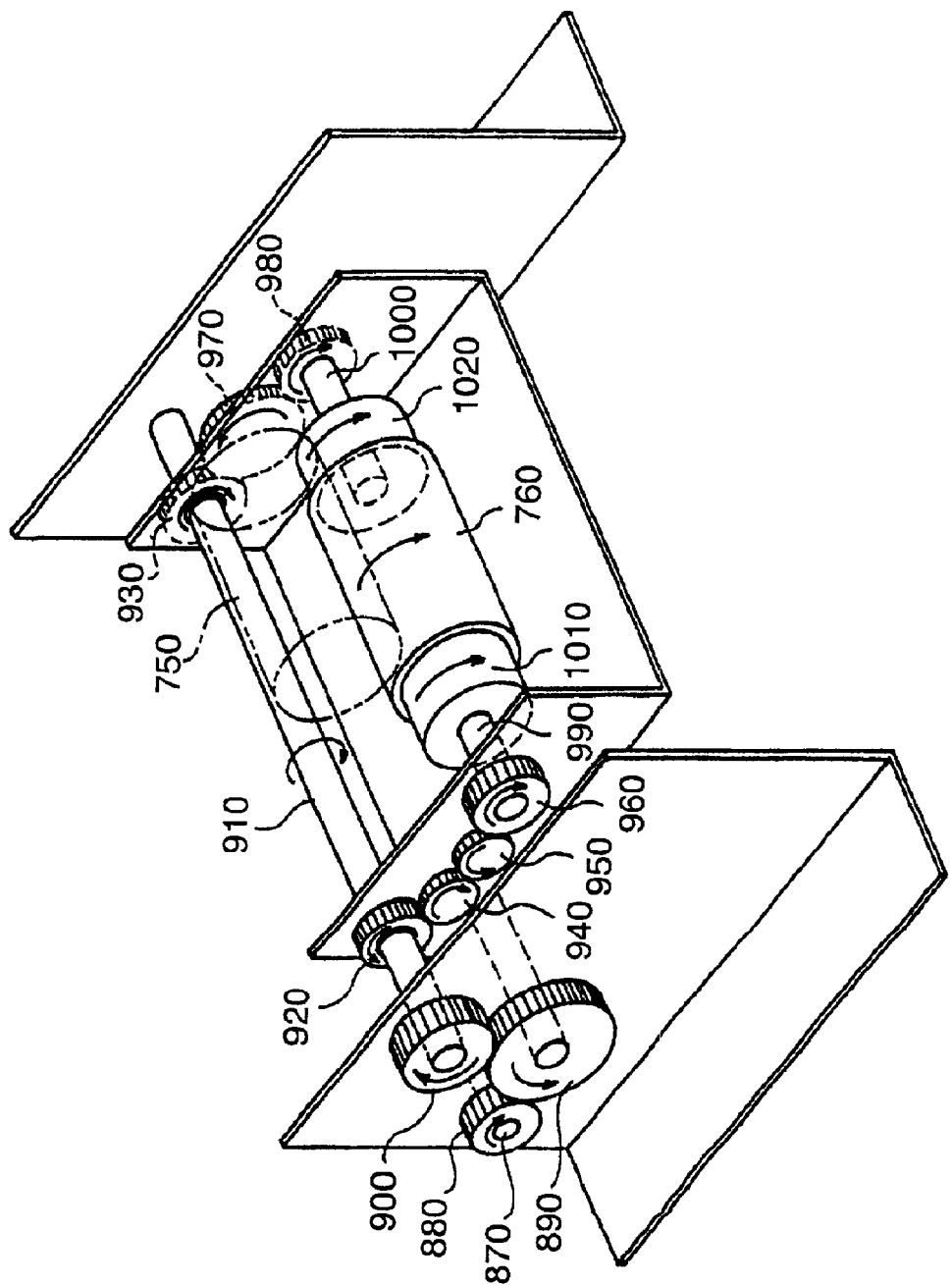
FIG. 14 Schematic view showing a key portion of a switching means for setting a torque value of a retardation roller.

FIG. 14 is a drawing showing the key portion of a switching means for setting torque values for the roller 760. As shown in FIG. 14, the roller 760 is driven by a retardation motor not shown in the drawing.

The switching means for the torque values for the roller 760 comprises gears 880, 890, 900, a revolving shaft 910, gears 920, 930 having a one-way clutch, gears 940, 950, 960, 970, 980, revolving shafts 990, 1000, and torque limiters 1010, 1020; these are coupling the motor output shaft 870 and the roller 760 together.

The gear 900 is fixed on the revolving shaft 910, while the gears 920, 930 having the one-way clutch are fixed on the revolving shaft 910 via the one-way clutch (not shown). The one-way clutch engages, or disengages, respective gears 920, 930 with the revolving shaft 910, depending on the revolving direction of the revolving shaft 910. When the revolving shaft 910 is revolving in the direction of an arrow in FIG. 14 (motor revolving in the normal revolution direction), the gear 920 is disengaged, while the gear 930 is engaged with the revolving shaft 910. On the other hand, when the revolving shaft 910 is revolving in the direction opposite to the arrow (motor revolving in reverse), the gear 920 is engaged, while the gear 930 is disengaged with the revolving shaft 910.

The revolving shaft 990 and the gear 960 are fixed to each other, while the revolving shaft 1000 and the gear 980 are fixed to each other. The torque limiters 1010, 1020 operate at different torque values TA, TB, respectively. The torque limiter 1010 conveys revolving motion of the revolving shaft 990 to the roller 760 at torque TA, while the torque limiter 1020 conveys that of the revolving shaft 1000 to the roller 760 at torque TB.

Referring to FIG. 14, while the retardation motor is revolving in the normal forward revolution direction, the revolving motion of the output shaft 870 is conveyed via the gears 880, 890, 900 to the revolving shaft 910. Under this situation, the gear 930 is engaged with the revolving shaft 910 by the effect of the one-way clutch, and the gears 970, 980 are put into revolution. This revolution is conveyed further to the roller 760 via the revolving shaft 1000 and the torque limiter 1020. Namely, the roller 760 is driven at torque TB by the effect of the torque limiter 1020 in the direction of arrow in FIG. 14.

Meanwhile, the revolving motion of roller 760 is conveyed via the torque limiter 1010 to the revolving shaft 990, and to the gears 960, 950, 940 until the gear 920 having the one-way clutch. However, since the gear 920 is disengaged with the revolving shaft 910 by the effect of the one-way clutch, revolving motion of the revolving shaft 910 remains uninfluenced.

Figure 15:
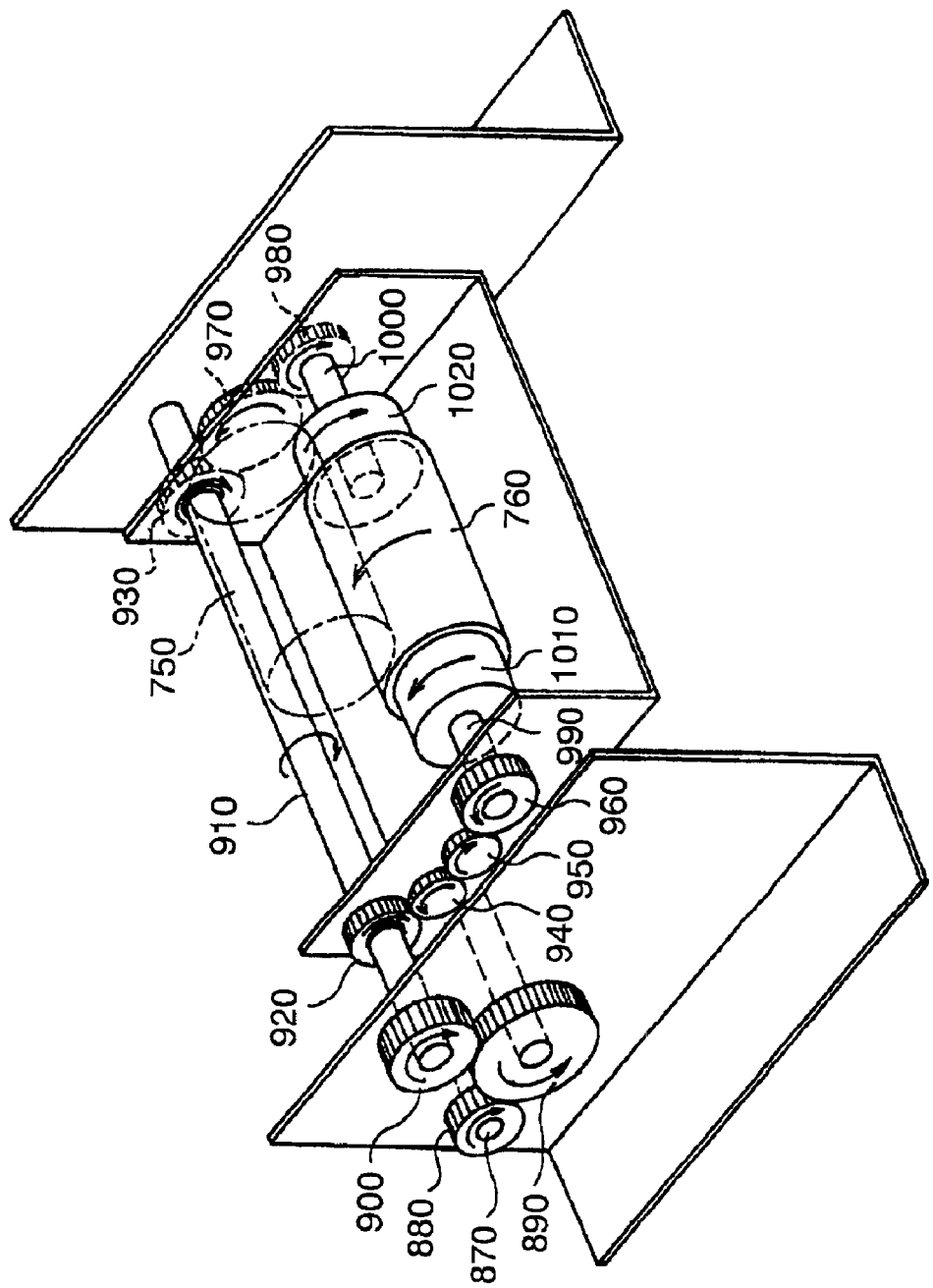
FIG. 15 is a drawing showing an operation when the retardation roller undergoes ancillary revolving.

FIG. 15 is a drawing describing the operation when the retardation roller makes a complying revolution. Since the retardation roller 760 is in contact with the roller 750, the roller 760 revolves in compliance with the revolution of roller 750, as shown in FIG. 15, in a case where there is no sheet in between, or there is only one sheet in between. When, the torque limiter 1020 allows slipping relative to the revolving shaft 1000, providing the roller 760 with an idle torque TB.

Meanwhile, the roller 760 drives the torque limiter 1010, the revolving shaft 990 and the gears 960, 950, 940 to revolve respectively in the directions as indicated by arrows in FIG. 15. By the influence of the one-way clutch, the gear 920 having the one-way clutch is put into a position of trying to revolve in the same direction as the revolving shaft 910. Under such a situation, if the revolving shaft 910 is to stay in an idle revolution without being engaged with the gear 920, angular velocity $\omega S13$ of revolving shaft 910 and angular velocity $\omega g14a$ of gear 920 should fulfil a relationship: $\omega g14a > \omega S13$. Namely) the gear 920 needs to be revolving faster than the revolving shaft 910. Since revolving speed (circumference speed) of the roller 760, when it is revolving in compliance with the roller 750, is approximately the same as that of the roller 750, the revolving shaft 910 and the gear wheel 920 do not become engaged together if the velocity ratio between the roller 760 and the roller 750 is set to be $\omega g14a > \omega S13$.

Figure 16:
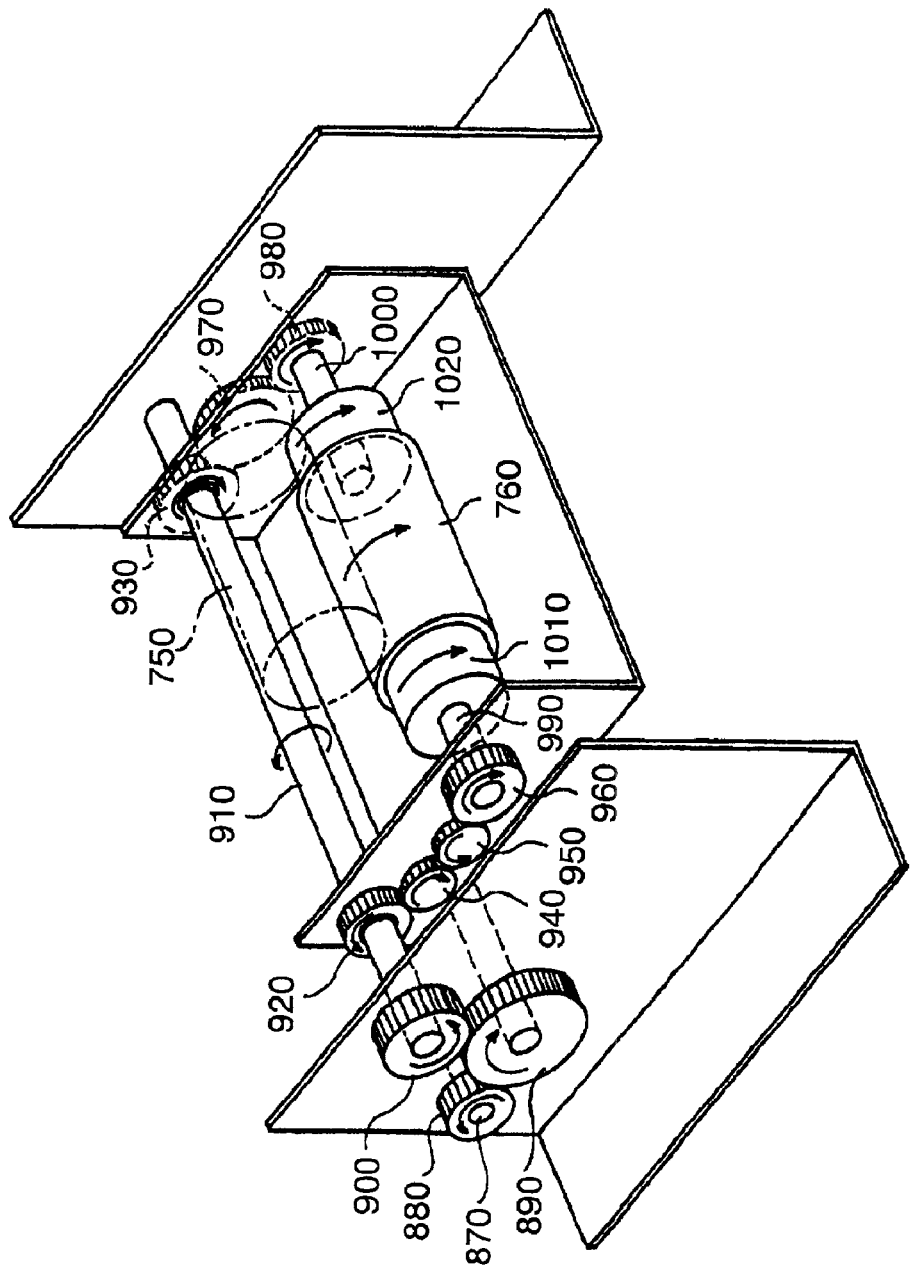
FIG. 16 is a drawing showing operation of the retardation roller when the retardation motor reverses.

Referring to FIG. 16, when the retardation motor is reversed, revolving motion of the output shaft 870 is conveyed via the gears 880, 890, 900 to the revolving shaft 910. When, the gear 920 is engaged with the revolving shaft 910 by the effect of the one-way clutch, the gears 940, 950, 960 are put into revolution. This revolution is conveyed further to the roller 760 via the torque limiter 1010. Namely, the roller 760 is driven at torque TA by the effect of torque limiter 1010 in the direction of an arrow.

Meanwhile, revolving motion of the roller 760 gives influence to the revolving shaft 1000 via the torque limiter 1020, and the motion is transferred via the gears 980, 970 until the gear 930 having one-way clutch. Since the gear 930 is disengaged with the revolving shaft 910 by the effect of the one-way clutch, revolution of the revolving shaft 910 is not influenced.

In an image scanner of the above-described configuration, when an operating button 130 provided in operation panel 120 as shown in FIG. 1 is pressed, the supply-separation motor (not shown) and the retardation motor start working, driving the supply roller 200, the roller 210 and the roller 220 into revolution in the directions as indicated respectively with arrows in FIG. 2. As already described earlier, in a case where there is no sheet between the roller 220 and the roller 210, or there is only one sheet nipped between the rollers, the roller 220 revolves in compliance with revolution of the roller 210 (reverse to the direction of the arrow).

When the roller 210 and the roller 220 nip the one sheet P, the torque value for the roller 220 is switched to TA or TB by driving the retardation motor in the forward or the reverse revolution so that the friction between roller 220 and sheet P becomes a certain specific torque in favor of sheet transfer. By so setting, when the uppermost one sheet P in the hopper 170 is picked up by the supply roller 200, the one sheet P is quickly transferred for undergoing the image reading conducted by the first and the second scanning sensors 250, 260, and then discharged to the recollection tray 140.

Thus, the revolution torque for the roller 760 can be set at TA or TB, by switching the revolving direction of the output shaft 870 of the retardation motor, which drives the roller. So, as already described earlier, if the revolution torque is set in advance at TA or TB in accordance with kind of the sheet P material so that it corresponds to a frictional force onto the roller 760 effective from the one sheet P nipped between the roller 750 and the roller 760, the roller 760 which is normally revolving in the direction that is reverse to the sheet transfer changes its revolution to the sheet transfer direction.

On the other hand, in a case where two or more sheets P are picked up by the supply roller 740, load incurred on the roller 760 decreases because it is more slippery between the sheets P. Therefore, the roller 760 keeps on revolving in the direction of the arrow shown in FIG. 15, and sends the bottom sheet of the overlaid sheets, which is in contact with the roller surface, back to the hopper 170.

In the above-described configuration, when two or more sheets P are picked up, only the uppermost sheet P is. transferred downstream, and the remainder is sent back to the hopper 170 by the revolution of the retardation roller. Namely, by setting a torque value for the roller 760 in advance at TA or TB in accordance with material (friction coefficient) of the sheet P, the overlaid sheet transfer can be prevented with various kinds of sheet P materials. The torque values for the roller 760 can be switched easily through the control in the revolving direction of the output shaft 870 of a driving motor.

Furthermore, there is another possibility that, if the retardation motor in the present embodiment is stopped and the output shaft 870 is fixed, the retarding torque of roller 760 can be made effective to be TA+TB.

Fifth Embodiment

Figure 17:
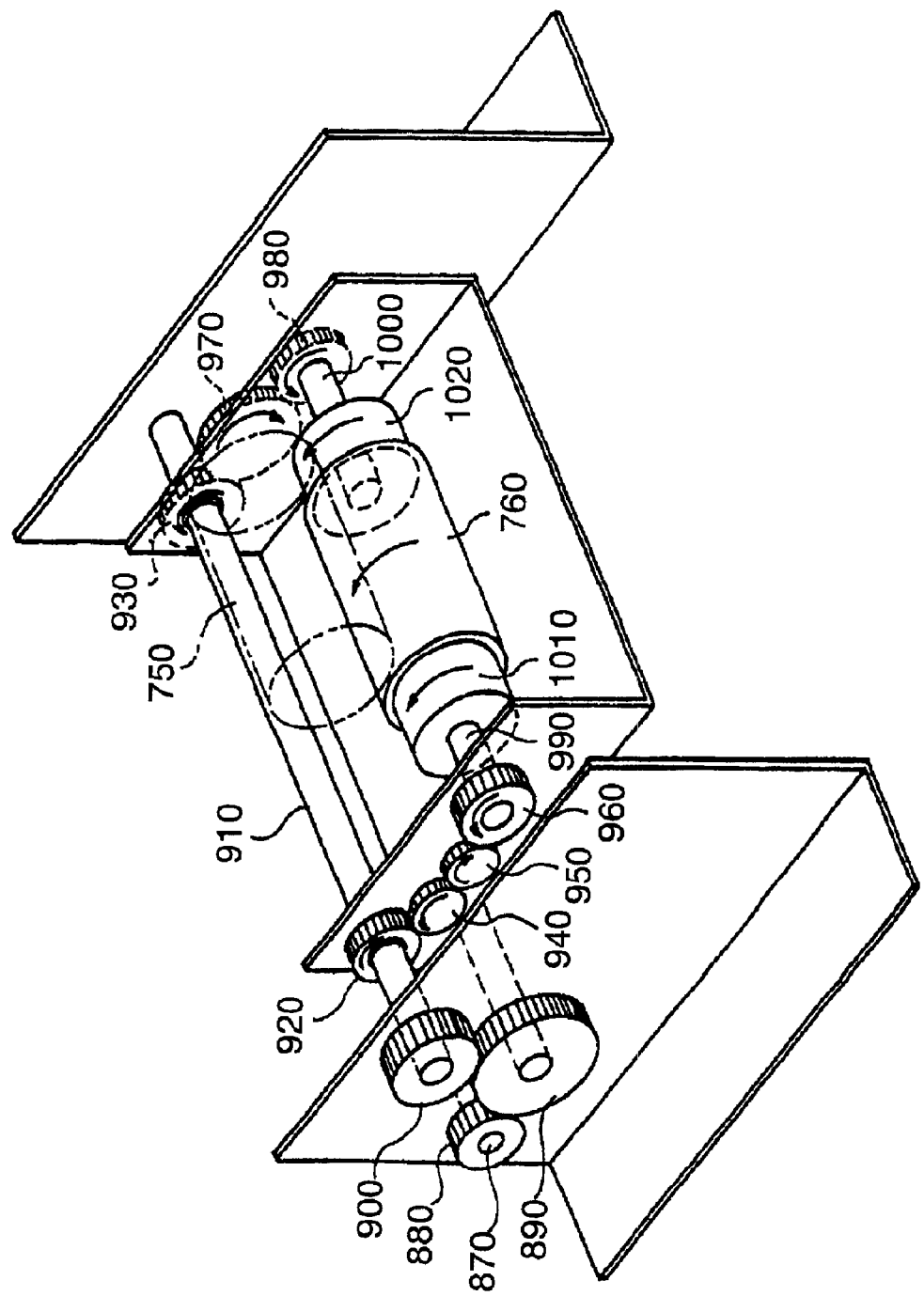
FIG. 17 is a drawing showing operation of the retardation roller when retardation motor is stopped.

FIG. 17 is a drawing used to describe operation of the roller 760 while the retardation motor is stopped.

In FIG. 17, when the retardation motor is stopped and the output shaft 870 is fixed, the revolving shaft 910 is locked, while the roller 760 is provided with a torque of trying to revolve in compliance to the direction as indicated with the arrow in FIG. 17. The torque effected on the roller 760 is conveyed, via the torque limiters 1010, 1020 provided at respective ends, to the revolving shaft 990, the gears 960, 950, 940, until the gear 920 having the one-way clutch, as well as to the revolving shaft 1000, the gears 980, 970, until the gear 930 having the one-way clutch, in the directions as indicated with arrows. When both of the gears 920 and 930 are engaged, the torque forces cancel each other. Therefore, the torque value for the roller 760 amounts to the sum of torque values TA and TB set to the torque limiters 1010, 1020 disposed at both ends: viz. TA+TB. Thus the torque load TA+TB acts as the reversing torque for preventing the document sheet to pass.

Now, requirements for setting respective torque values TA, TB for the torque limiters 1010, 1020 are described in the following referring to FIG. 18.

Figure 18A:
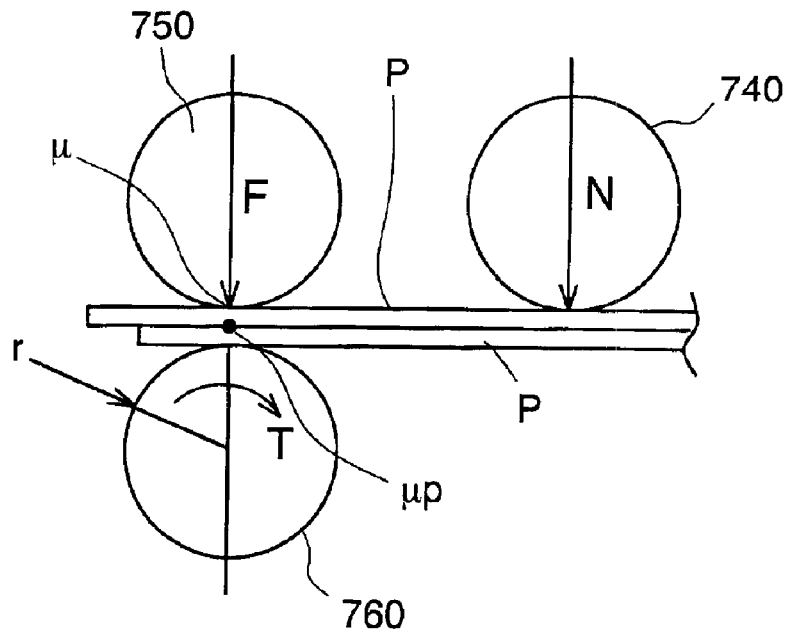
FIG. 18(a) Cross sectional view of the mechanism showing a relation between the pressing force and the friction, among the supply roller, the separation roller and the retardation roller.

In FIG. 18(a): F is a pressing force of roller 760, N is a pressing force of supply roller 740, $\mu$ is a friction coefficient between rollers 750, 760 and sheet P, $\mu$F is a friction coefficient among sheets P, T is a torque set for roller 760, and r is a radius of roller 760.

When the following requirements are satisfied, the torque T becomes a torque with which the friction between the roller 760 and the sheet P works in favor of sheet supply direction when the roller 760 and the S roller 750 nip the one sheet P.

$$F > (1/\mu) \times (T/r) + (\mu F - p)/\mu \times N \quad (1)$$

$$F < (1/\mu F) \times (T/r) - 2N \quad (2)$$

On the other hand, in a case when to or more sheets P are nipped, the torque T becomes a torque for sending the sheet P which is making contact with roller 760 back to the hopper 170, resisting a mutual frictional force among the sheets P.

Figure 18B:
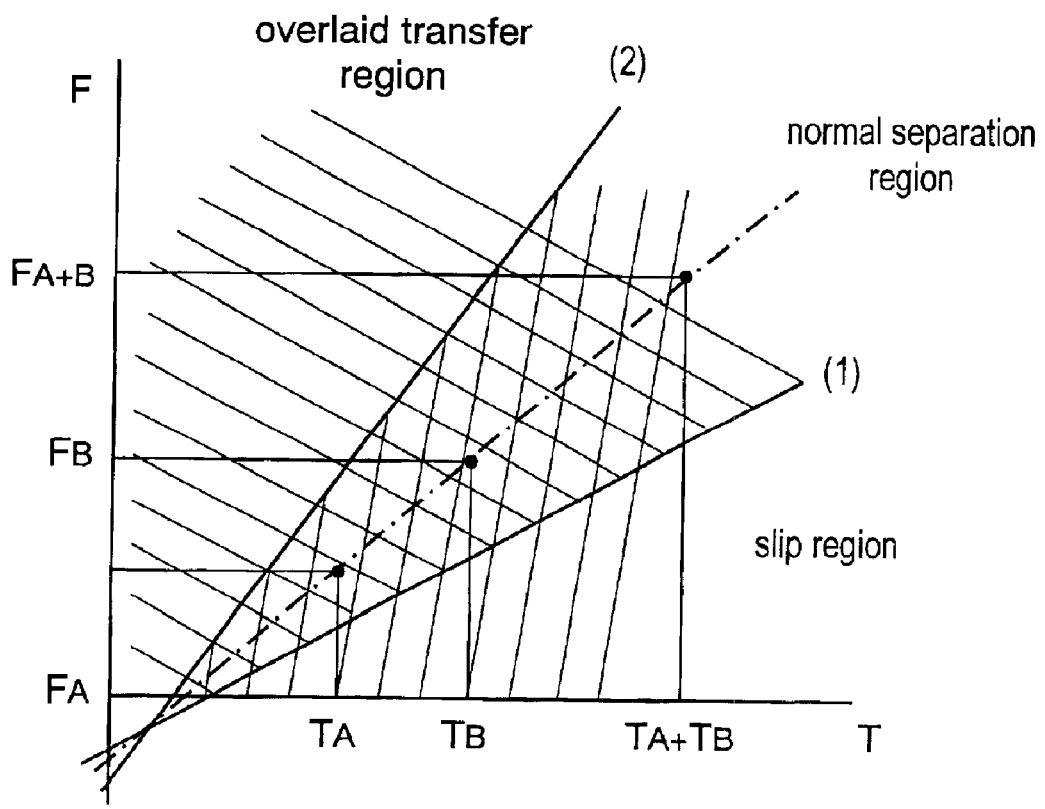
FIG. 18(b) is a drawing showing a relation of the pressing force of the separation roller and the torque set for the retardation roller versus the normal separation region.

Therefore, a torque T within a range that satisfies the above formulae (1) and (2) (viz. the normal separation region in FIG. 18(b)) is set for the roller 760 as the torque TA, TB on condition that TA<TB.

An image scanner in the present embodiment is further provided with means (not shown) for detecting thickness of the sheet P nipped by the roller 750 and the roller 760. The sheet thickness detecting means is disposed at a point immediately after the nipping point formed by the roller 750 and the roller 760. Any device would be effective for the means in so far as it can detect thickness of the sheet P; it may be constituted with a displacement meter, for example.

In the image scanner of the above-described configuration, the operating principle remains the same as that in fourth embodiment, when it is supplied with one sheet.

On the other hand, in a case when two or more thin sheets P are picked up by the supply roller 200, or when one thick sheet having more thickness than two sheets (for example, 0. 600 mm thick or more) is picked up by the supply roller 200, the sheet thickness detection means detects that the sheet thickness is equal to a thickness of more than two sheets. A torque switching time chart for a retardation roller is shown in FIG. 19.

In a reading apparatus of the present example, the retardation motor is switched from the normal forward revolution to a halt as indicated at (b) in FIG. 19, when the sheet thickness detecting means detects a sheet thickness worth more than two sheets, as shown at (a) in FIG. 19, and revolution of the roller 760 stops. At this time, the torque for the roller 760 becomes TA+TB, as shown at (c) in FIG. 19, effecting as the frictional force on the sheet P. And then, the retardation motor is switched from the halt to reverse revolution as shown at (b) in FIG. 19. The torque for the roller 760 turns out to be TB.

When two or more thin sheets P are picked up by the supply roller 740 and reach the nip point, the sheets P face a stronger retarding torque of torque TB. This makes separation among the sheets P easier. The friction coefficient $\mu$ among the sheets P is normally within an approximate range $\mu$=0.3–0.7. As described earlier, the higher friction coefficient $\mu$ is liable to introduce the overlaid sheet transfer. In the present embodiment, the torque TA is set at a value suitable to those sheets of low friction coefficient $\mu$, while the torque TB is set at a value suitable to those sheets of high friction coefficient $\mu$. Thereby, it is intended to bring the torque TB into operation as the retarding torque when the sheets of high friction coefficient $\mu$ are delivered overlaid.

Meanwhile, when one thick sheet worth more than two sheets is picked up by the supply roller 740 and reach the nip point, the retarding torque TB is put into operation. Thick sheets, however, generally have a high rigidity, so the sheets may not be easily damaged despite the high retarding torque TB.

Namely, since thin sheets are vulnerable to a strong retarding torque force, the reading device in the present embodiment normally employs the torque TA which is suitable to the thin sheets; while in such other cases when thin sheets of high friction coefficient $\mu$ are delivered overlaid, or when one thick sheet is delivered, it employs the stronger retarding torque TB, for avoiding the overlaid transfer of such sheets.

Thus in the normal situation, the retardation motor makes normal forward revolution and the roller 760 is set at torque TA; as soon as the sheet thickness detection means detects a thickness worth two or more sheets, torque for the roller 760 is switched to TB. In this way, the torque value effective on sheet P is TA when one thin sheet P is picked up by the supply roller 740; whereas, the torque TB is brought into effect when two or more thin sheets P, or one thick sheet worth more than two sheets are picked up.

One thin sheet P faces a low torque TA and possible damage thereon can be prevented; while overlaid sheets P, or a thick sheet, face a high torque TB and effectiveness of the overlaid transfer prevention can be enhanced. The switching of the torque values for the roller 760 can be made by an easy procedure of controlling the revolving direction of output shaft 870 of a retardation motor, which drives the roller.

Referring to FIG. 18(*b*), the area of the normal separation region moves upward along with the increasing torque value T set for the roller 760. Therefore, it is preferred, when switching the torque for roller 760 from the low TA to the high TB, to switch the pressing force F of separation roller 750 simultaneously. The optimum pressure value should preferably be such that it is located in the middle zone of the normal separation region in the chart; the optimum pressure values corresponding to the torque values TA, TB and TA+TB are, respectively, FA, FB and FA+FB.

The pressing force F can be switched, for example, by making use of a mechanism for adjusting the pressure of roller 220 described with reference to FIG. 2. Or, the pressure of roller 210 may be adjusted instead by using a similar mechanism for the same purpose. Namely, the overlaid sheet transfer can be prevented with a higher reliability, by adjusting the nipping force between the roller 210 and the roller 220 at the same time when the torque for the roller 220 is switched.

In accordance with the present invention, the overlaid sheet transfer is avoided with a high reliability, by automatically switching, according to thickness of the sheet material, a plurality of torque limiters effecting on the retardation roller; thereby adjusting torque for the retardation roller.

Furthermore, the overlaid sheet transfer can be avoided with a higher reliability, by introducing a structure in which the nipping force between the separation roller and the retardation roller is adjusted when the torque limiters are switched; thereby shifting the nipping force between the separation roller and the retardation roller in accordance with an adjusted torque value set for the retardation roller.

Still further, in the present invention, the torque values for the retardation roller can be set in advance at certain specific values in accordance with kind of materials of the sheet (friction coefficient). Thus the overlaid sheet transfer can be avoided with varieties of sheet materials, by pre-adjusting the torque value for the retardation roller to be suitable to the sheet material.

In the foregoing examples, description has been made using paper sheets. However, the sheet material is not limited to paper in the image readers or the sheet feeders in accordance with the present invention. The present invention is of course applicable to various kinds of plastic sheets or any other sheet materials, in so far as they accept printing of information thereon.

What is claimed is:

1. An image reader comprising:

a supply roller for delivering a sheet material out of stacked sheets;

a first separation roller;

a second separation roller and a third separation roller provided on a shaft of said first separation roller;

a retardation roller containing a torque limiter, said retardation roller nipping the sheet material in collaboration with said first separation roller; and a pair of corrugation rollers provided on a shaft of said retardation roller at respective locations corresponding to a place between said first separation roller and said second separation roller, and a place between said first separation roller and said third separation roller.

2. The image reader of claim 1, wherein said corrugation rollers are eccentric to the shaft of said retardation roller.

3. The image reader of claim 1, further comprising:

a reading glass plate provided in an optical scanning system, said reading glass plate being provided with an electroconductive layer on a surface thereof; and a platen roller opposing said reading glass plate, said platen roller being in contact with an electricity escaping brush.

4. A sheet feeder comprising:

a supply roller for delivering a sheet material out of stacked sheets;

a first separation roller;

a second separation roller and a third separation roller provided on a shaft of said first separation roller;

a retardation roller containing a torque limiter, said retardation roller nipping the sheet material in collaboration with said first separation roller; and a pair of corrugation rollers provided on a shaft of said retardation roller at respective locations corresponding to a place between said first separation roller and said second separation roller, and a place between said first separation roller and said third separation roller.

5. The sheet feeder of claim 4, wherein said corrugation rollers are eccentric to the shaft of said retardation roller.

6. A sheet feeder comprising:

a supply roller for delivering a sheet material out of stacked sheets; and a pair of rollers comprising a separation roller and a retardation roller;

a plurality of torque limiters, each of said torque limiters having a different torque value and being disposed between said retardation roller and a shaft for driving the retardation roller;

switching means for switching among said plurality of torque limiters; and detecting means for detecting a thickness of said sheet material, said detecting means controlling said switching means in accordance with the thickness of said sheet material.

7. The sheet feeder of claim 6, wherein said switching means engages said shaft with respective torque limiters in accordance with a revolving direction of said shaft.

8. The sheet feeder of claim 6, further comprising means for adjusting a nipping force between said separation roller and said retardation roller in accordance with a switching conducted by said switching means.

* * * * *